United States Patent [19]
Anderson et al.

[11] Patent Number: 5,986,675
[45] Date of Patent: *Nov. 16, 1999

[54] SYSTEM AND METHOD FOR ANIMATING AN OBJECT IN THREE-DIMENSIONAL SPACE USING A TWO-DIMENSIONAL INPUT DEVICE

[75] Inventors: Michael David Anderson, Bellvue; Susan O'Donnell, Bellevue, both of Wash.; Narendra Varma, Paddington, Australia

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/653,404

[22] Filed: May 24, 1996

[51] Int. Cl.$^6$ ............................. G06T 15/70; G06T 13/00
[52] U.S. Cl. ............................................ 345/473; 345/474
[58] Field of Search ..................................... 345/473, 428, 345/431, 429, 433, 437, 474, 121, 136, 419, 425, 435, 118, 475

[56] References Cited

U.S. PATENT DOCUMENTS

| | | | |
|---|---|---|---|
| 3,883,235 | 5/1975 | Lynn et al. | 351/39 |
| 4,894,774 | 1/1990 | McCarthy et al. | 364/410 |
| 4,952,051 | 8/1990 | Lovell et al. | 352/87 |
| 5,261,041 | 11/1993 | Susman | 395/152 |
| 5,467,441 | 11/1995 | Stone et al. | 395/133 |
| 5,564,000 | 10/1996 | Halpern | 395/152 |
| 5,594,856 | 1/1997 | Girard | 395/173 |
| 5,684,943 | 11/1997 | Abraham et al. | 395/173 |

OTHER PUBLICATIONS

User Manual for Microsoft 3–D Movie Maker, pp. 16–31.

*Primary Examiner*—Joseph H. Feild
*Assistant Examiner*—Alford W. Kindred
*Attorney, Agent, or Firm*—Jones & Askew, LLP

[57] ABSTRACT

A process for creating a 3D computer animated movie or animated sequence of images. A 3D scene and actor (a class of 3D objects) are initially selected by the user. The user moves the mouse to place and orient the actor within the 3D scene without requiring additional types of input beyond 2D mouse inputs. Positioning and orienting of the actor is accomplished based on the distance and angle of mouse movement. Once the actor has been placed in the desired location and with the desired orientation, the content of the movie can be recorded. While recording, the user moves the actor along a path and selects actions or events to be performed along the path. By using a location-based recording model, editing and synchronization of the movie are enhanced. One example of an action performed by the actor is to change costumes. The costume of the actor is changed by selecting part of the actor with a single user interface operation, such as a mouse click. Repeatedly clicking upon the selected part of the actor cycles through different costumes on that part of the actor.

22 Claims, 31 Drawing Sheets

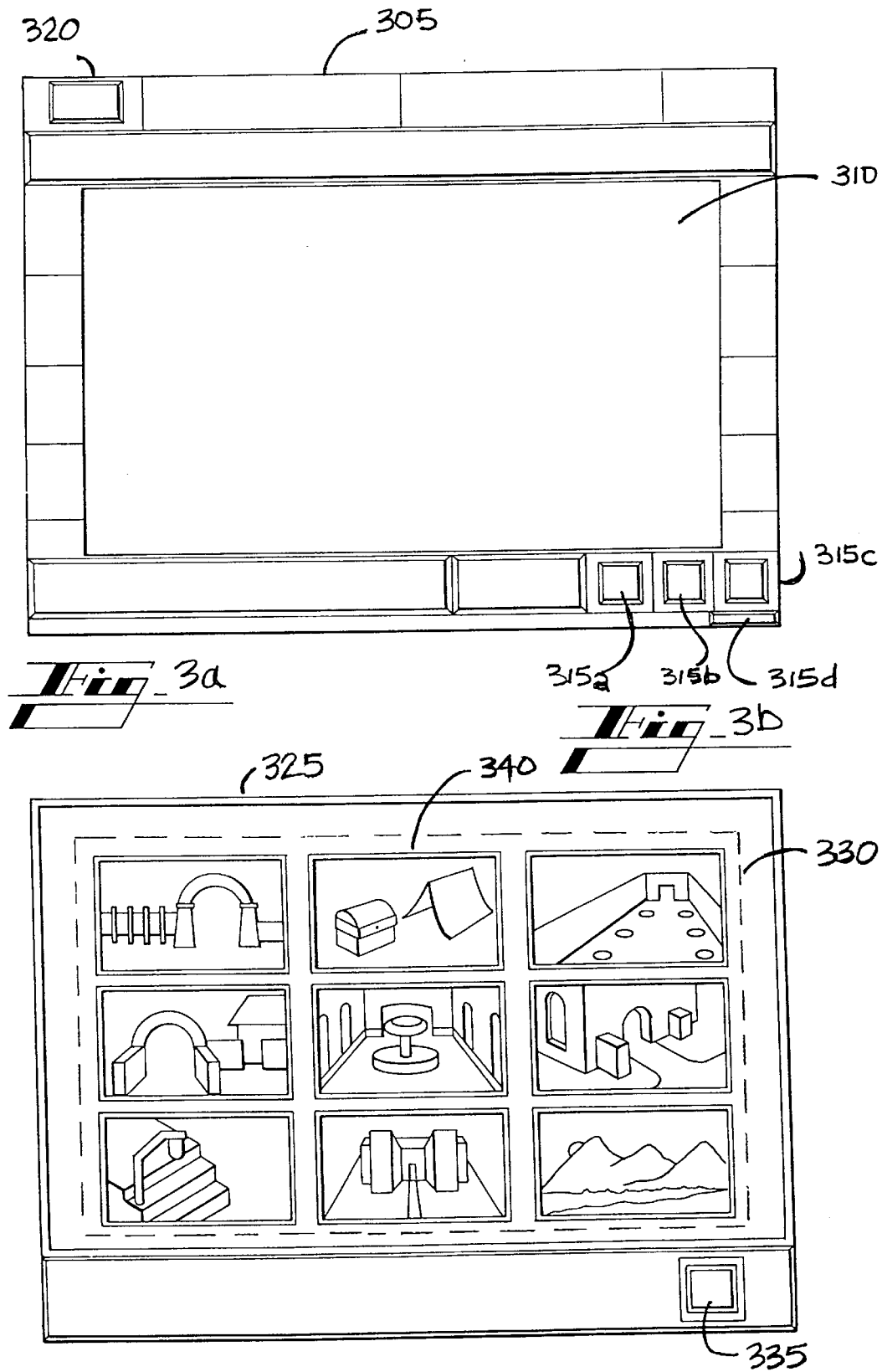

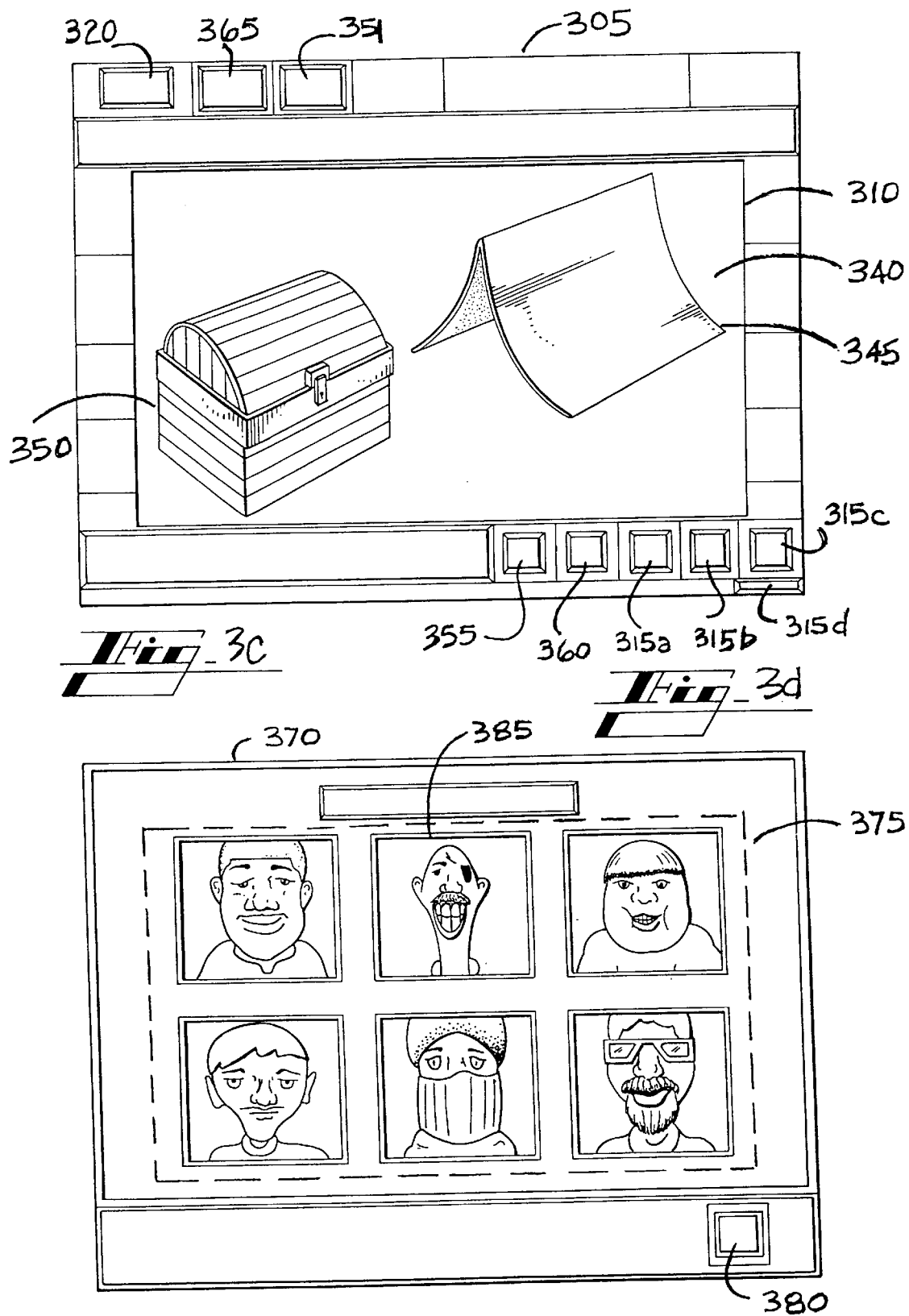

| P | Candidate Position (x,z) (y is fixed) | Δx (pn,pn-1') | Δz (pn,pn-1') | Distance (pn,pn-1') | Oc (candidate orientation) (rad, deg) | E (radians) (degrees) | W=k1*d; k1=1/3; (.1≤w<1) | Et=E, but k3≤Et≤k4 k3=0.2*π k4=4*k3 | k3/Et | D= D*(k3/Et) | Displayed Point Position x' | Displayed Point Position z' | Angle O' (modified orientation) (degrees) |
|---|---|---|---|---|---|---|---|---|---|---|---|---|---|
| 0 | (0,0) | | | | | | | | | | 0 | 0 | 0 |
| 1 | (0,5) | 0 | 5 | 5 | π / 180 | π / 180 | 1 | 0.8 π | 0.25 | 1.25 | 0 | 1.25 | 180 |
| 2 | (0,15) | 0 | 13.75 | 13.75 | π / 180 | 0 / 0 | 1 | 0.2 π | 1 | 13.75 | 0 | 15 | 180 |
| 3 | (0,25) | 0 | 10 | 10 | π / 180 | 0 / 0 | 1 | 0.2 π | 1 | 10 | 0 | 25 | 180 |
| 4 | (0,35) | 0 | 10 | 10 | π / 180 | 0 / 0 | 1 | 0.2 π | 1 | 10 | 0 | 35 | 180 |

Fig. 10b

Fig. 11a

| P | Candidate Position (x,z) (y is fixed) | Δx (pn,pn-1') | Δz (pn,pn-1') | Distance (pn,pn-1') | Oc (candidate orientation) (rad, deg) | E (radians) | E (degrees) | W=k1*d; k1=1/3; (.1≤w<1) | Et=E, but k3≤Et≤k4 k3=0.2*π k4=4*k3 | k3/Et | D= D*(k3/Et) | Position x' | Displayed Point z' | Angle O' (modified orientation) (degrees) |
|---|---|---|---|---|---|---|---|---|---|---|---|---|---|---|
| 0 | (0,0) | | | | | | | | | | | | | 0 |
| 1 | (0,1) | 0 | 1 | 1 | π 180 | π | 180 | 0.333 | 0.8 π | .25 | .25 | 0 | 0.25 | 60.000° |
| 2 | (0,2) | 0 | 1.75 | 1.75 | π 180 | 0 | | 0.583 | 0.2 π | 1 | 1.75 | 0 | 2 | 130.000° |
| 3 | (0,3) | 0 | 1 | 1 | π 180 | 0 | | 0.333 | 0.2 π | 1 | 1 | 0 | 3 | 146.667° |
| 4 | (0,4) | 0 | 1 | 1 | π 180 | 0 | | 0.333 | 0.2 π | 1 | 1 | 0 | 4 | 157.778° |
| 5 | (0,6) | 0 | 2 | 2 | π 180 | 0 | | 0.666 | 0.2 π | 1 | 2 | 0 | 6 | 172.593° |
| 6 | (0,9) | 0 | 3 | 3 | π 180 | 0 | | 1 | 0.2 π | 1 | 3 | 0 | 9 | 180.000° |
| 7 | (0,13) | 0 | 4 | 4 | π 180 | 0 | | 1 | 0.2 π | 1 | 4 | 0 | 13 | 180.000° |
| 8 | (0,18) | 0 | 5 | 5 | π 180 | 0 | | 1 | 0.2 π | 1 | 5 | 0 | 18 | 180.000° |
| 9 | (0,28) | 0 | 10 | 10 | π 180 | 0 | | 1 | 0.2 π | 1 | 10 | 0 | 28 | 180.000° |
| 10 | (0,38) | 0 | 10 | 10 | π 180 | 0 | | 1 | 0.2 π | 1 | 10 | 0 | 38 | 180.000° |

Fig. 11b

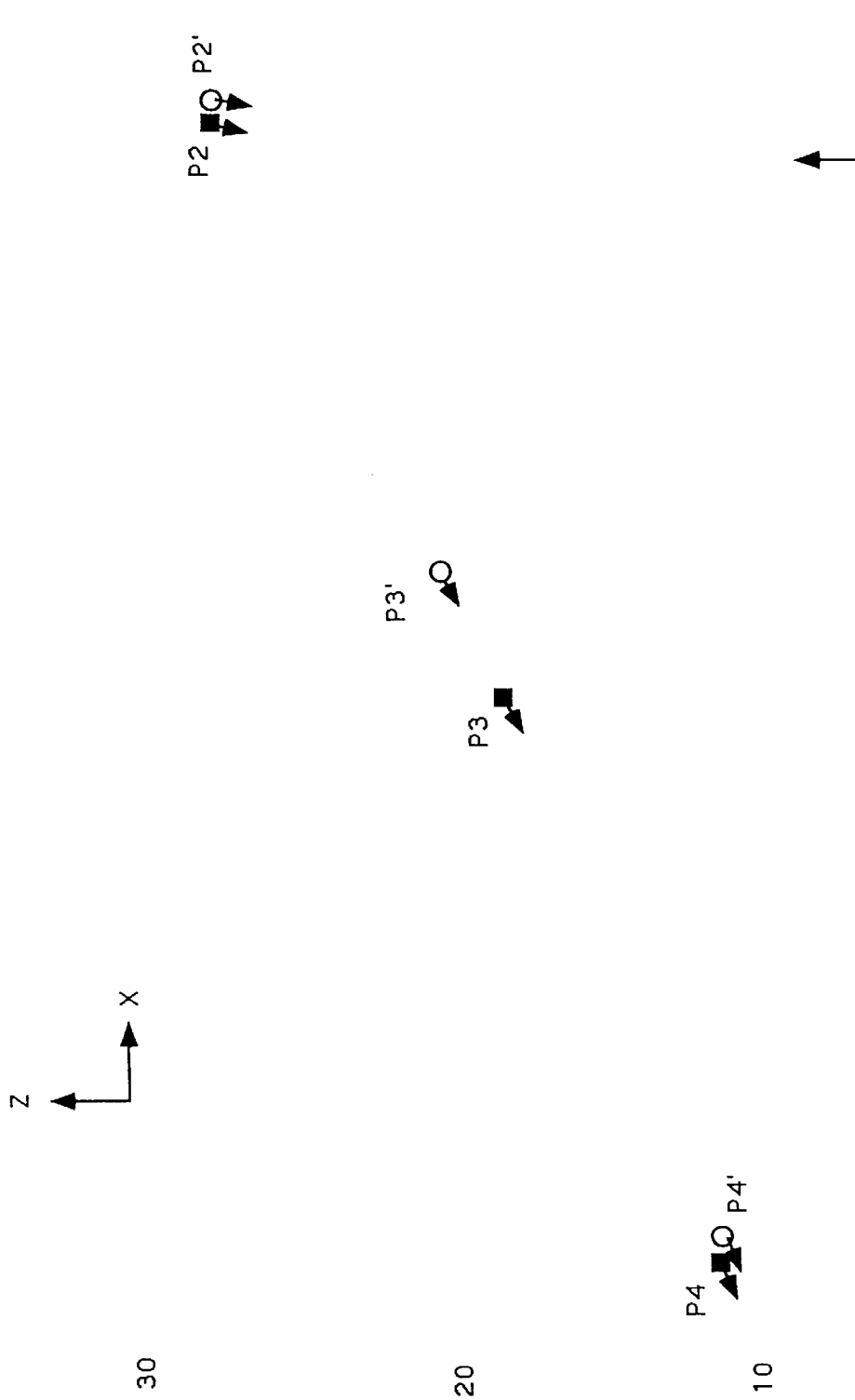

| P | Candidate Position (x,z) (y is fixed) | Δx (pn,pn-1') | Δz (pn,pn-1') | Distance (pn,pn-1') | Oc (candidate orientation) (rad, deg) | E (radians) (degrees) | W=k1*d; k1=1/3; (.1≤w<1) | Et=E, but Et≤E; k3≤Et≤k4 k3=0.2*π k4=4*k3 | k3/Et | D= D*(k3/Et) | Position x' | Displayed Point z' | Angle O' (modified orientation) (degrees) |
|---|---|---|---|---|---|---|---|---|---|---|---|---|---|
| 0 | (70,60) | | | | | | | | | | | | |
| 1 | (70,44) | 0 | 16 | 16 | 0 0 | 0 | 1 | 0.2 π | 1 | 16 | 70 | 60 | 0 |
| 2 | (66,28) | 4 | 16 | 16.5 | .245 14 | .245 14 | 1 | 0.2 π | 1 | 16.5 | 70 | 44 | 0 |
| 3 | (48,18) | 18 | 10 | 20.6 | 1.064 60.9 | .819 46.9 | 1 | .819 | .767 | 15.8 | 66 | 28 | 14 |
| 4 | (30,12) | 22.2 | 8.3 | 23.7 | 1.213 69.5 | .150 8.6 | 1 | 0.2 π | 1 | 23.7 | 52.2 | 20.3 | 60.9 |
| 5 | (20,10) | 10 | 2 | 10.2 | 1.373 78.7 | .160 9.2 | 1 | 0.2 π | 1 | 10.2 | 30 | 12 | 69.5 |
| 6 | (16,10) | 4 | 0 | 4 | 1.571 90 | .198 11.3 | 1 | 0.2 π | 1 | 4 | 20 | 10 | 78.7 |
| 7 | (12,10) | 4 | 0 | 4 | 1.571 90 | 0 | 1 | 0.2 π | 1 | 4 | 16 | 10 | 90 |
| 8 | (10,12) | 2 | 2 | 2.83 | 2.356 135 | .785 45 | .943 | .785 | .8 | 2.27 | 12 | 10 | 90 |
| 9 | (12,14) | 1.6 | 2.4 | 2.88 | 3.73 213.7 | 1.372 78.7 | .960 | 1.372 | .46 | 1.3 | 10.4 | 11.6 | 132 |
| 10 | (14,14) | 2.9 | 1.3 | 3.18 | 4.29 245.8 | .582 33.4 | 1 | 0.2 π | 1 | 3.18 | 11.1 | 12.7 | 210 |
| | | | | | | | | | | | 14 | 14 | 245.8 |

Fig. 12d

| | PATH | | | EVENT | | | | |
|---|---|---|---|---|---|---|---|---|
| Node # | Coord | d | | Action | Node | +D | ET | Var |
| 0 | 0,0,0 | 2 | | Run | 0 | 0 | 0 | - |
| 1 | 2,0,0 | 3 | | | | | | |
| 2 | 5,0,0 | 2 | | | | | | |
| 3 | 7,0,0 | 1 | | | | | | |
| 4 | 8,0,0 | 2 | | | | | | |
| 5 | 10,0,0 | 3 | | | | | | |
| ⋮ | | | | | | | | |
| 45 | 90,0,0 | 2 | | | | | | |
| 46 | 92,0,0 | 3 | | | | | | |
| 47 | 95,0,0 | 2 | | | | | | |
| 48 | 97,0,0 | 1 | | | | | | |
| 49 | 98,0,0 | 2 | | | | | | |
| 50 | 100,0,0 | | | Faint | 50 | 0 | 15 | 0 |

Node #   0 1 2 3 ...

Path    o o o o o o o o o o o o o o o o o o o o o o o o o o o o o o
          ↑                  ↑              ↑                          ↑
Event   Run                Walk           Change                     Faint
                                          Costume

FIG.18

PATH

| Node # | Coord   | d |
|--------|---------|---|
| 0      | 0,0,0   | 2 |
| 1      | 2,0,0   | 3 |
| 2      | 5,0,0   | 2 |
| 3      | 7,0,0   | 1 |
| 4      | 8,0,0   | 2 |
| 5      | 10,0,0  | 3 |
| ⋮      |         |   |
| 45     | 90,0,0  | 2 |
| 46     | 92,0,0  | 3 |
| 47     | 95,0,0  | 2 |
| 48     | 97,0,0  | 1 |
| 49     | 98,0,0  | 2 |
| 50     | 100,0,0 |   |

EVENT

| Action  | Node | +D | ET | Var   |
|---------|------|----|----|-------|
| Run     | 0    | 0  | 0  | -     |
| Walk    | 10   | 0  | 0  | -     |
| Costume | 25   | 0  | 0  | Denim |
| Faint   | 50   | 0  | 15 | 0     |

| Object Part # | Description | Parent of Object Part | Object Part Set |
|---|---|---|---|
| 0 | Torso | -1 | 0 |
| 1 | Neck | 0 | 1 |
| 2 | Head | 1 | 1 |
| 3 | Left Upper Arm | 0 | 0 |
| 4 | Left Forearm | 3 | 0 |
| 5 | Left Hand | 4 | 1 |
| 6 | Rt. Upper Arm | 0 | 0 |
| 7 | Rt. Forearm | 6 | 0 |
| 8 | Rt. Hand | 7 | 1 |
| 9 | Pelvis | 0 | 2 |
| 10 | Left Upper Leg | 9 | 2 |
| 11 | Left Lower Leg | 10 | 2 |
| 12 | Left Foot | 11 | 3 |
| 13 | Rt. Upper Leg | 9 | 2 |
| 14 | Rt. Lower Leg | 13 | 2 |
| 15 | Rt. Foot | 14 | 3 |

| Object Part Set Description | Object Part Set Designation |
|---|---|
| Shirt | 0 |
| Head | 1 |
| Pants | 2 |
| Shoes | 3 |

| Group # | Torso | Left Upper Arm | Left Forearm | Rt. Upper Arm | Rt. Forearm |
|---|---|---|---|---|---|
| 1 | White | White | White | White | White |
| 2 | Denim | Denim | Denim | Denim | Denim |
| 3 | Green | Green | Flesh | Green | Flesh |

SYSTEM AND METHOD FOR ANIMATING AN OBJECT IN THREE-DIMENSIONAL SPACE USING A TWO-DIMENSIONAL INPUT DEVICE

TECHNICAL FIELD

This invention relates to a system and method for creating and storing computer-generated animation, and is more particularly related to a system and method for placing and orienting objects in space and for recording actions performed by the objects as they travel along a path.

BACKGROUND OF THE INVENTION

Modern computers provide effective tools for producing animated movies. Computerized animation techniques provide many advantages over conventional pen-and-ink animation. For example, conventional animation requires that each cell or frame in an animated sequence be drawn and inked individually. This requires painstaking attention to detail in order to ensure that each object, such as the animated scenery and actors, appear consistent from one cell to the next.

Computer animation solves these problems because once an object is drawn, it can be repeated from cell to cell quickly, and without any variation. Likewise, computers employ a variety of three-dimensional (3D) rendering techniques in order to represent 3D objects, such as actors, which change position or location from one cell to the next.

Simple graphics applications use wire frame drawings to connect points along the surface of a 3D object in order to visually represent surface details of a 3D object. Wire frames give the computer user a sense of depth perception, while minimizing the amount of surface detail in order to reduce the computer processing capacity required to represent and manipulate the 3D object. Although wire frames may be used to effectively represent some 3D objects, the lack of detailed surface attributes may result in the 3D object having an unrealistic or confusing appearance.

Ray tracing is a 3D graphical technique that has been used to render much more detailed and realistic representations of 3D objects. Essentially, ray tracing is a complex method of producing shadows, reflections, and refractions in three dimensions. Ray tracing calculates the brightness, the reflectivity, and the level of transparency of the object by tracing light backwards from the viewer's eye to the object from which light bounced off. By using more complex graphical techniques, such as ray tracing, a computer user can create an image of a 3D object and provide a great amount of graphical detail.

Although computer animation effectively addresses many of the difficulties associated with traditional animation techniques, it introduces various considerations of its own. For example, the input devices associated with most computers include a keyboard and a pointing device, such as a mouse. Although a mouse provides input in only two dimensions, 3D animation typically requires that the object be moved in at least four dimensions, including movement along the x, y, and z axes, and rotation about the vertical axis (i.e., the y-axis). Prior art methods have addressed this problem by using keyboard input (e.g., the arrow keys) to control movement in the third or fourth dimensions. For example, the mouse may be used to move the object from right to left (x-axis) and front to back (z-axis), while the up/down and left/right arrow keys are used to move the object vertically (y-axis) and rotate the object about the y-axis, respectively. Although these solutions allow the user to move the object as needed, they do not provide a simple, effective interface for moving the object in three or more dimensions. In order to provide a simple, effective user interface, it is desirable to place the object in the x-z plane and orient the object about the y-axis using only input from the mouse. Therefore, there is a need in the art for an improved method for placing and orienting an object.

In computer animation, it is necessary for the program to record where the specific actions or events performed by the object are supposed to take place. A computer animated movie, like any other linear story, has the concept of time associated with it. A frame in a digital movie represents a snapshot of the animated objects (scene, actors, etc.) in time as it would in actual film. The movie is replayed by replaying all the events for each frame in each scene.

In light of this fact, an approach used in prior art computer animation is to match the events to the frames of the movie, i.e., to make the events time-based. Although this approach works well when recording the initial path and events, it produces unsatisfactory results when the original movie is edited. In an example where the animated object is an actor, the actor may run into a room in frames 1–20, and sit down on a chair in frames 21–23 in the original sequence. If the user wishes to change the initial action from a run to a walk along that same path, in a model in which events are bound to frames, the actor would be approximately midway to the chair by frame 21 and would sit down in space long before he reached the chair. Therefore, there is a need for a method of recording the path of an object and events performed by the object that facilitates editing and maintains the proper relationship between the events and the object's position along a path.

An example of an event that may be performed by an object is changing the appearance of an animated object. In the context of traditional theater and motion picture productions, it is common for actors to change costumes during and between scenes. Selecting costumes is a crucial part of any theatrical production. Similarly, changing the appearance of an animated object can help tell a story more effectively.

In the realm of computer animation, changing an object's appearance or attributes is very different than the real world of shrugging off a robe, wiping off makeup, and reappearing from the dressing room with a new look. During the process of making a computer animated movie, changing an object's appearance or attributes can involve making intricate changes to the attributes of the object. A great deal of attention must be paid to how dull or shiny is the surface of the object or its parts, what color is the object or its parts, the shape of the object and what detail or texture is mapped to the surface of the object. In order to change the appearance or attributes of an object, the three-dimensional surface of the object must be painstakingly analyzed, changed if desired, and redrawn by the computer. This process is repeated for every surface of the animated object with multiple user interface operations.

This process is a very flexible way to change the appearance of a computer animated object. However, the process can be complex and extremely time intensive. It requires a great deal of skill by the user to understand the graphical manipulations required to change the attributes of each individual part of the object. Therefore, there is a need for a simple, intuitive and efficient process for changing the appearance of an object.

In summary, there is a need in the art for an improved method of placing and orienting an object using only two-dimensional input from a mouse. Additionally, there is a need for a method of recording the location of an object and events performed by the object that facilitates editing and maintains the proper relationship between the events and the object's location. Finally, there is a need for a simple, intuitive and efficient method for changing the appearance of an object.

SUMMARY OF THE INVENTION

The present invention satisfies the above described needs by providing an improved method for placing and orienting an actor in a scene. Two-dimensional input may be used to position the actor in three dimensional space and to simultaneously adjust the orientation of the actor about an axis perpendicular to a user-defined plane. The present invention also provides a location-based system and method for storing data associated with the path traversed by an actor and with the events performed by the actor as it traversed the path. Data is stored in such a manner that it may be edited without adversely affecting the synchronization with earlier recorded events. The present invention also provides a simple, intuitive method for changing the appearance of an object. This method allows the user to change the appearance of all object parts associated with an object with a single user interface operation.

Generally described, in one aspect, the present invention provides an iterative method for placing and orienting an object in a three dimensional space. The object is displayed at a start location and has a start orientation relative to a reference axis in the three dimensional space. The method receives coordinates corresponding to a candidate point for the object in the three dimensional space. The distance D between the start location and the candidate point is calculated, along with a candidate orientation for the object. A display location for the object is determined based on the distance D, the start orientation, and the candidate orientation. A display orientation for the object is determined based on the distance D, the start orientation, and the candidate orientation. The object is displayed at the display location and oriented at the display orientation in the three dimensional space.

More particularly described, the present invention provides a computer system for placing and orienting an object. The computer system includes a processing unit, an input device connected to the processing unit, and a display device coupled to the processing unit for displaying the object. The processing unit is operative to display the object at a start location having a start orientation relative to a reference axis in the three dimensional space. In response to user input, the processing unit receives coordinates corresponding to a candidate point for the object in the three dimensional space. The processing unit calculates the distance D between the start location and the candidate point, and a candidate orientation for the object. The processing unit determines a display location and a display orientation for the object based on the distance D, the start orientation, and the candidate orientation. Finally, the processing unit displays the object at the display location and oriented at the display orientation in the three dimensional space.

In another aspect, the present invention provides a method for storing data corresponding to the path traversed by an object and to the actions executed by the object as it traverses the path. The method determines a first one of the actions to be performed by the object and provides a series of images associated with the first action. Each of the images defines a distance of travel of the object. The method determines whether the object is moving. If so, the method identifies a plurality of nodes along the path. The nodes correspond to the location associated with an occurrence of one of the series of images. If the object is not moving, the method determines the location of the object and the amount of time the action is executed at the location. The method then stores a path list comprising the location of the nodes and an event list comprising the location at which the first action begins and the elapsed time the first action is performed at the location.

In another aspect, the present invention provides a method for editing data corresponding to actions executed by an object as it traverses a path. The method provides a path list comprising the location of a plurality of nodes corresponding to the path and an event list comprising at least one action associated with the path list. The method identifies a location along the path and a new action to be performed by the object at the location. The event list is amended to include the new action, the location at which the new action begins and the elapsed time the new action is performed at the location.

In yet another aspect, the present invention provides a method for changing the appearance of an object having a plurality of object parts. The method displays the object on a display device and selects one of the plurality of object parts in response to a single operation. The selected object part is associated with an object part set, which has one of a plurality of attributes. The method changes the first attribute associated with the object part set to a second of the plurality of attributes in response to selection of the object part. Finally, the method displays the object part set using the second of the plurality of attributes.

More particularly described, an aspect of the present invention provides a method for changing the appearance of an object having a plurality of object parts. The method displays the object on a display device and selects one of the plurality of object parts. The method determines an object part set associated with the selected object part. The object part set has one of a plurality of attributes, each of which includes a plurality of display parameters assigned to each of the object parts associated with the object part set. The method then determines an ordered list of object parts associated with the object part set and a second of the plurality of attributes including a different plurality of display parameters. The different plurality of display parameters are applied to each of the object parts in the list of object parts.

It is therefore an object of the present invention to provide an improved method for simultaneously placing and orienting an object.

It is a further object of the present invention to provide an improved system and method for storing and editing data representing a path traversed by an object and actions performed by the object as it traverses the path.

It is a further object of the present invention to provide an improved method for changing the appearance of an object that includes a plurality of parts.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3, consisting of FIGS. 3a–3d, is an illustration of the screen displays provided by the preferred program for supporting a user's selection of a scene and actor.

FIG. 11, consisting of FIG. 11a and FIG. 11b, is an illustration of the calculations resulting from the preferred method to determine the new position and orientation of the actor.

FIG. 18 is a diagram of an edited path traversed by an actor and associated event data.

FIG. 19 is a table of values stored in a path list and an edited event list corresponding to the diagram of FIG. 18.

FIG. 21 is a table that numerically illustrates the hierarchical relationship between object parts that make up an object corresponding to the diagram of FIG. 20.

FIG. 22 is a table designating specific object part sets corresponding to FIG. 21.

FIG. 23 is a table of display parameters forming different display attributes or costumes for a "shirt" object part set.

DETAILED DESCRIPTION OF THE PREFERRED EMBODIMENT

Figure 1:
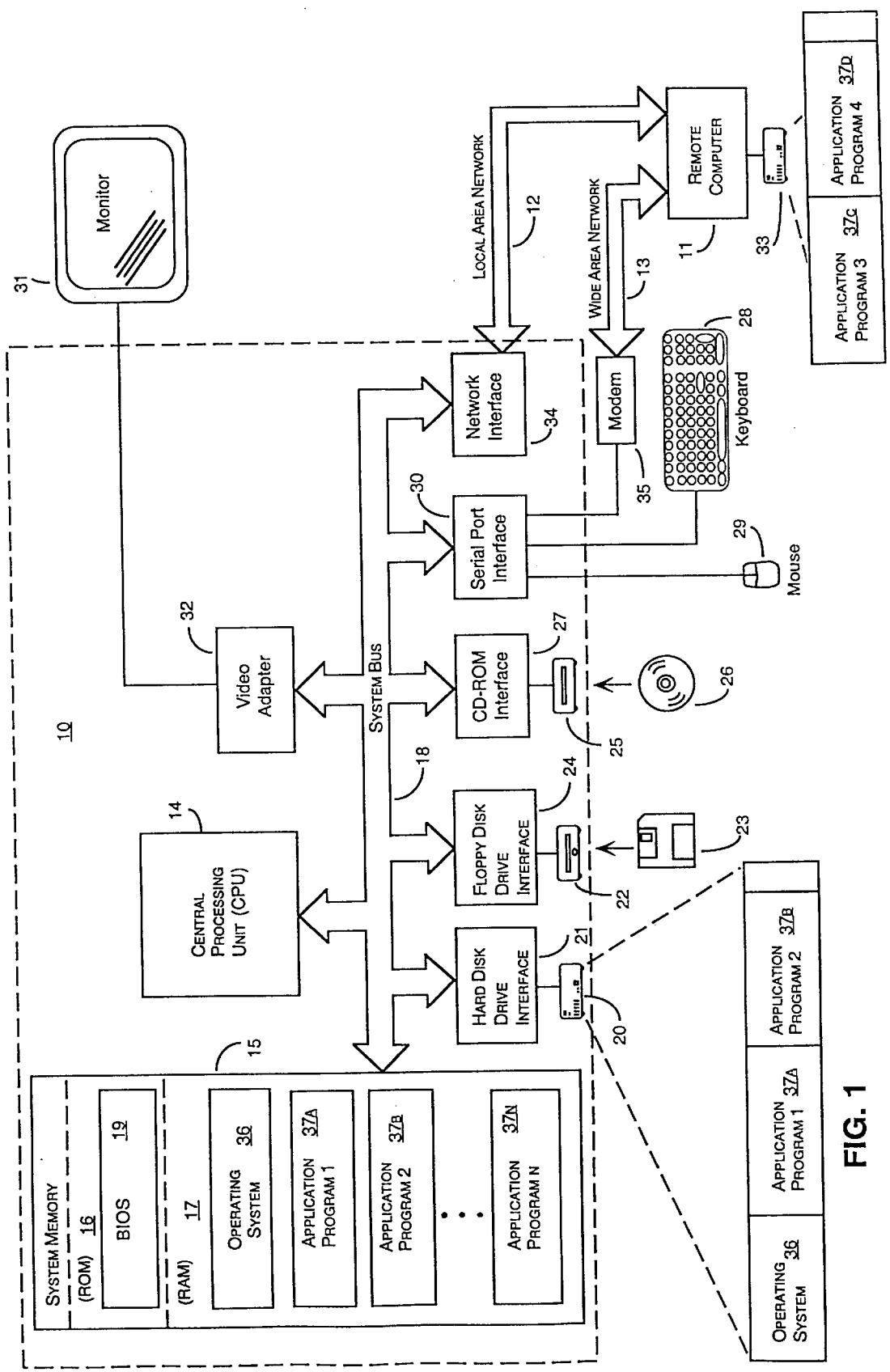
FIG. 1 is a block diagram of a personal computer that provides the operating environment for the preferred embodiment of the present invention.

The present invention is directed to a system for placing, orienting, and recording actions of an object. The preferred embodiment of the present invention is represented by the "3D MOVIE MAKER" program, which is a computer animation application program marketed by Microsoft Corporation of Redmond, Wash. Briefly described, the preferred program allows users to create their own animated 3D movie or animated sequence of images by using a variety of computer animated actors and scenes. The user selects a scene and an actor to appear in the scene. The selected actor is then placed and oriented in the 3D scene. One aspect of the present invention is directed to the concept of positioning and orienting an object, such as an actor, on the bases of the distance of mouse movement and the angle of mouse movement. After placing and orienting the actor, the user begins to record the movie and causes the actor to move along a user-defined path anywhere in a scene and perform any of a variety of actions, such as walking, crawling, and changing costumes. Another aspect of the present invention is directed to storing events and actions in association with the actor's location along the user-defined path and applying events or actions on the basis of where the actor is located along the path or the elapsed time at a location. In the preferred program, one of the variety of actions is changing the actor's costume. The actor changes costumes when the user selects part of an actor's costume with a single user interface operation such as a mouse click. Another aspect of the present invention is directed to changing the appearance of an object, such as an actor, by selecting part of the object with a single user interface operation, such as a mouse click. Thus, the preferred application provides a system and method for placing and orienting an object in space and for recording actions performed by the object as it travels along a path.

Although the preferred embodiment will be generally described in the context of an program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit, memory storage devices for the processing unit, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the processing unit via a communication network. Those skilled in the art will recognize that such a communications network may be a local area network or may be a geographically dispersed wide area network, such as an enterprise-wide computer network or the global Internet.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, altering, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

THE OPERATING ENVIRONMENT

Figure 2:
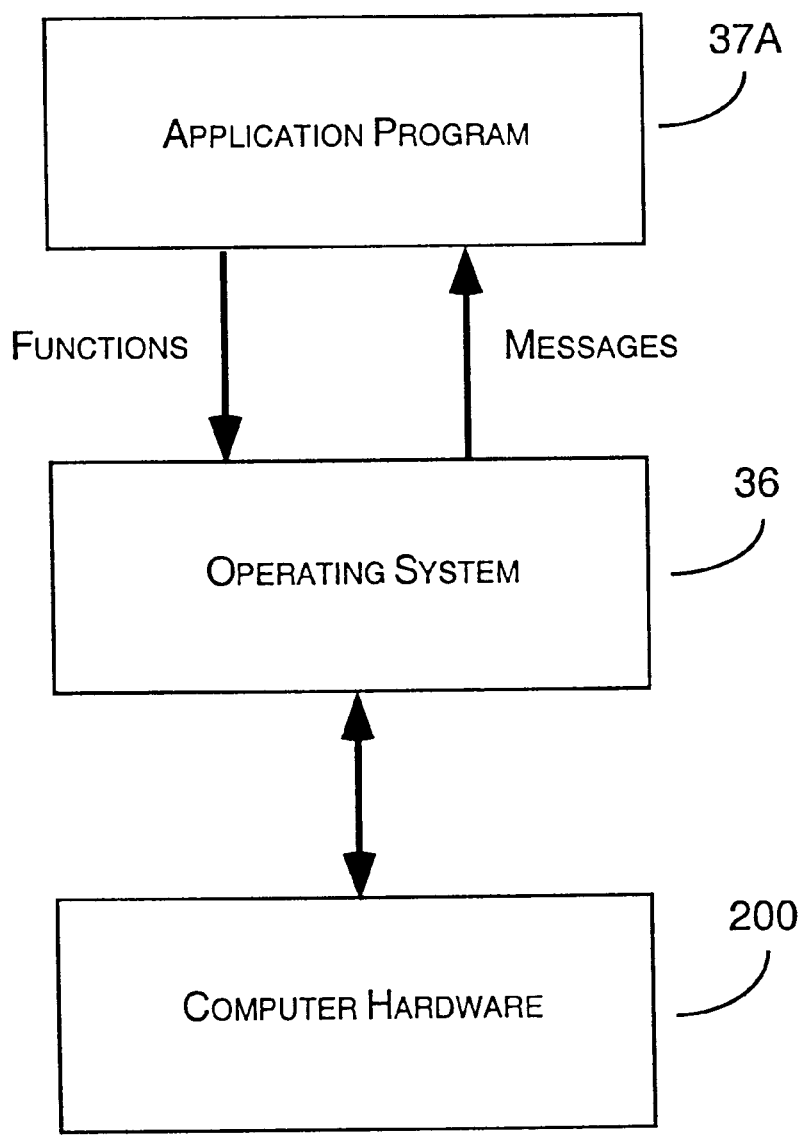
FIG. 2 is a block diagram illustrating the interface between a computer's input/output devices, an operating system, and an application program.

FIGS. 1 and 2 illustrate various aspects of the preferred computing environment in which the present invention is designed to operate. Those skilled in the art will immediately appreciate that FIGS. 1 and 2 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processing unit 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the processing unit 14 by a system bus 18. The BIOS 19 for the personal computer 10 is stored in ROM 16. Those skilled in the art will recognize that the BIOS 19 is a set of basic routines that helps to transfer information between elements within the personal computer 10.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via one of the local or remote memory storage devices, which may include the local hard disk drive 20, floppy disk 23, CD-ROM 26, RAM 17, ROM 16, and the remote memory storage device 33. In the personal computer 10, the local hard disk drive 20 is used to store data and programs, including the operating system and programs.

FIG. 2 is a simplified block diagram illustrating the interaction between the computer hardware 200, the operating system 36, and an application program 37a. Referring now to both FIGS. 1 and 2, when the personal computer 10 is turned on or reset, the Basic Input/Output System (BIOS) 19, which is stored in the ROM 16, instructs the processing unit 14 to load the operating system 36 from the hard disk drive 20 into the RAM 17. Once the operating system 36 is loaded into RAM 17, the processing unit 14 executes the operating system 36 and causes the visual elements associated with the user interface of the operating system 36 to be displayed on the monitor 31.

The operating system 36, in conjunction with the BIOS 19 (FIG. 1) and associated device drivers, provides the basic interface between the computer's resources, the user, and the application program 37a. The operating system 36 interprets and carries out instructions issued by the user. For example, when the user wants to load an application program 37a, the operating system 36 interprets the instruction (e.g., double clicking on the application program's icon) and causes the processing unit 14 to load the program code into RAM 17 from either the local hard disk drive 20, floppy disk 23, CD-ROM 26, or the remote memory storage device 33. Once the application program 37a is loaded into the RAM 17, it is executed by the processing unit 14. In case of large programs, the processing unit 14 loads various portions of program modules into RAM 17 as needed.

As discussed earlier, the preferred embodiment of the present invention is embodied in the "3D MOVIE MAKER" program, which is designed to operate in conjunction with Microsoft Corporation's "WINDOWS 95" or "WINDOWS NT" operating systems. However, it should be understood that the invention can readily be implemented in other operating systems, such as Microsoft Corporation's "WINDOWS 3.1" operating system, IBM Corporation's "OS/2" operating system, and the operating system used in "MACINTOSH" computers manufactured by Apple Computer, Inc.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message or by executing the requested task.

In the context of the present invention, the primary interaction between the preferred program and the operating system involves mouse-related functions and messages. As will be described more completely below, the program receives mouse coordinates and mouse button status from the operating system. For example, when placing and orienting an actor in a scene of the preferred program, an actor is visually associated with the mouse and its movement. As the user places the actor within the scene by moving the mouse across the screen, the mouse coordinates and mouse button status are provided to the program by the operating system. The primary "WINDOWS 95" operating system messages and function calls involved in this process are discussed below.

In general, a window procedure receives mouse messages from the operating system whenever the mouse cursor passes over the window or a mouse button is clicked within a window. The "WINDOWS 95" operating system posts a WM_MOUSEMOVE message to the appropriate program when the cursor is moved over the "client area" of a window. When the user presses or releases the left mouse button while the cursor is in the client area, the operating system posts a WM_LBUTTONDOWN or WM_LBUTTONUP message to the window.

The WM_MOUSEMOVE, WM_LBUTTONDOWN, and WM_LBUTTONUP messages each include two parameters known as lParam and wParam. The lParam parameter indicates the position of the mouse cursor. The low order word of the lParam indicates the x-coordinate, and the high-order word of the lParam indicates the y-coordinate. The coordinates are given in "client coordinates," where the position is relative to the upper left corner of the client area of the window. The wParam parameter contains flags that indicate the state of the mouse buttons and the SHIFT and CNTRL keys. These can be checked when mouse message processing depends on the state of another mouse button or of the SHIFT and CNTRL keys.

From this brief description, it should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" published by Microsoft Press and "Advanced Windows" published by Microsoft Press.

Likewise, those skilled in the art will appreciate that the preferred program, "3D MOVIE MAKER," provides a wide variety of features and functions in addition to those included in the brief description presented above. For additional information regarding the "3D MOVIE MAKER" program, the reader may refer to the documentation that is distributed by Microsoft Corporation with the program.

THE PREFERRED ANIMATION PROGRAM

Turning now to FIGS. 3–24, the general process of creating an animated movie by using the preferred program will be described. In the context of the present invention, an object is a three-dimensional (3D) representation of a tangible item. An object may be modeled as having a number of related sub-parts or object parts. In the preferred embodiment, a representative type of object is a 3D humanoid actor having multiple body parts.

In the preferred program, a user is able to easily create a 3D animated movie with 3D scenes, actors, and props. Initially the user selects a scene from a group of available scenes. The user then selects an actor from a group of actors and places and orients the actor in the scene. After placing and orienting the actor, the user begins to record the movie, which consists of a computer-animated sequence of images. While recording, the user moves the actor along any arbitrary path that is defined by the user and causes the actor to perform any of a variety of actions, such as walking, crawling, and changing costumes. In the preferred program, the actor changes costumes when the user selects part of an actor's costume with a single user interface operation such as a mouse click. Once the action is recorded, the user may replay or edit the movie. This process will now be described in additional detail in conjunction with various drawing figures. Although the description refers to a single actor, it should be understood that two or more actors may be placed in the same scene, and that multiple actors may appear to interact with each other as a result of the actions that are recorded for each actor.

FIGS. 3a–d illustrate the screen displays provided by the preferred program in order to allow the user to select a 3D scene and actor. FIG. 3a depicts an initial movie creation screen 305, which includes a scene display area 310 and a series of general operational choice buttons 315a–d. The movie creation screen 305 is displayed by the preferred program after the user indicates that he or she wishes to create a new movie. The movie creation screen 305 provides a "File" button 315a that may be used to save a movie to or to load a movie from one of the computer's memory storage devices. A "Help" button 315b activates a display of textual information to assist the user. A "Map" button 315c assists the user with other available dialog windows in the preferred program. An "Exit" button 315d allows the user to exit from the preferred program.

In the preferred program, the first step in the creation of a movie is to select a 3D scene or background, which provides a 3D environment or stage for an actor. The user accomplishes this using the mouse to select the "Scene Choice" button 320 on the movie creation screen 305.

FIG. 3b depicts a scene browser 325, which is displayed by the preferred program in response to the user's selection of the "Scene Choice" button 320. The scene browser 325 displays a variety of available scenes 330 from which the user may choose. The user selects one of the available scenes 330 by moving the mouse over the desired scene 340 and clicking the mouse button. If the user decides not to select one of the available scenes 330, the "Cancel" button 335 may be selected at any time.

Referring now to FIG. 3c, once a scene is selected, the preferred program displays the movie creation screen 305 with the selected scene 340 appearing in the scene display area 310. The scene 340 is rendered on the monitor as a 3D perspective rendering and may include several props, such as a tent 345 and a treasure chest 350. The user may place additional props in the desired scene 340 by selecting the "Props" button 351.

At this point, several additional buttons also appear in the movie creation screen 305. The "Undo" button 355 allows the user to undo the last step taken. The "Edit" button 360 allows a user to edit the actions associated with the selected scene 340.

Once the scene 340 is selected, the user chooses an actor by selecting an "Actor Choice" button 365. FIG. 3d illustrates an actor browser 370, which is displayed in response to the user selecting the "Actor Choice" button 365. The actor browser 370 displays a variety of available actors 375 that can be used in an animated 3D movie. The user selects one of the available actors 375 by moving the mouse over the desired actor 385 and clicking on that actor 385. If the user does not wish to select one of the available actors 375, a "Cancel" button 380 may be selected at any time.

Figure 4A:
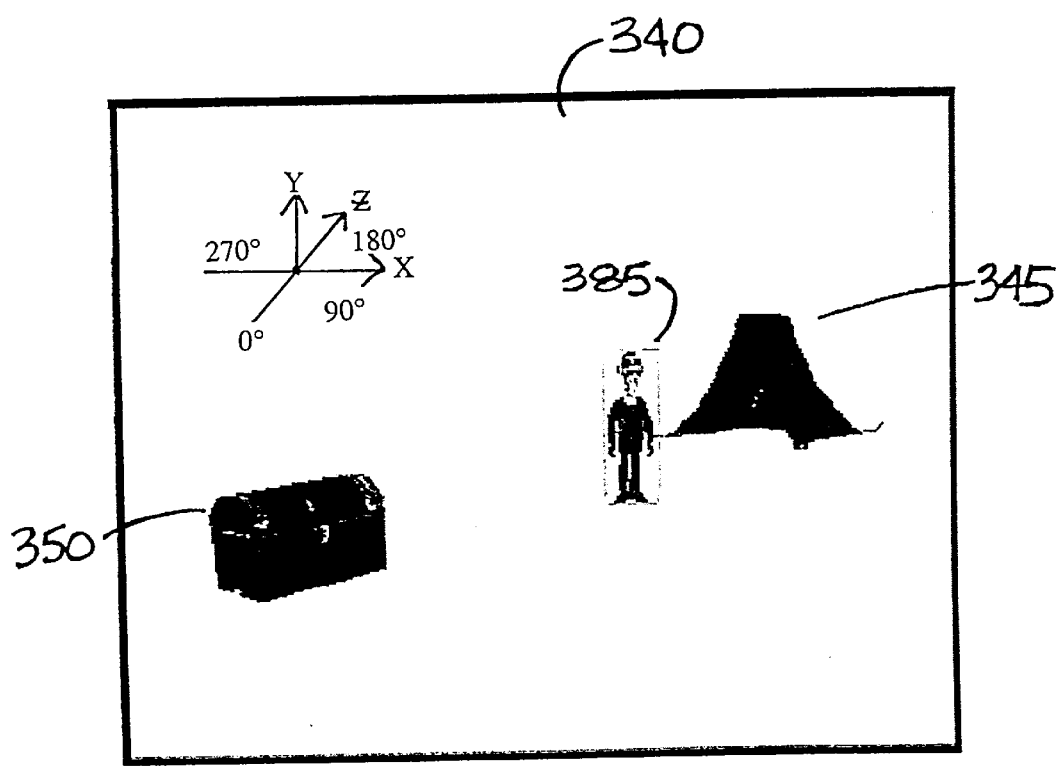
FIG. 4, consisting of FIGS. 4a–4e, is an illustration of the screen displays provided by the preferred program for supporting a user's placement and orientation of an actor in a scene.

After the user selects an actor from the actor browser, the preferred program displays the actor at an initial position in the previously selected scene. As illustrated in FIG. 4a, the initial position is the approximate center of the scene with the actor facing the user. The user may then use one of the aspects of the present invention to move the actor to another position and reorient the actor prior to beginning to record the movie.

In the preferred program, the actor 385 is placed in the x-z plane (indicated in FIG. 4a) and oriented about the y-axis using the 2D input from the mouse. The actor 385 is initially located at ground level (with respect to the y-axis), but may be moved up and down using the arrow keys on the keyboard 28 (FIG. 1). Those skilled in the art will recognize that there are also "three dimensional mouses," which include y-axis controls (e.g., a roller) that can be used in lieu of the up and down arrow keys on the keyboard.

FIGS. 4a–4e depict screen displays associated with placing and orienting an actor 385 in a scene 340. In FIGS. 4a–e, the actor is moved, as a result of mouse movement, along a curved path toward the front left side of the screen. It is important to note that while the actor 385 is moving during the placing and orienting of the actor 385, the preferred program does not record any movement or action of the actor 385. This allows the user to use the mouse to move the actor to a desired position for the beginning of the scene.

FIG. 4a depicts the actor 385 at the initial position in the approximate center of the scene. At this point, the actor 385 is facing the user, which is an absolute reference of zero degrees. 3D (x-y-z) axes and angular reference are shown for purposes of this discussion and do not actually appear in the screen displays of the preferred program.

Figure 4B:
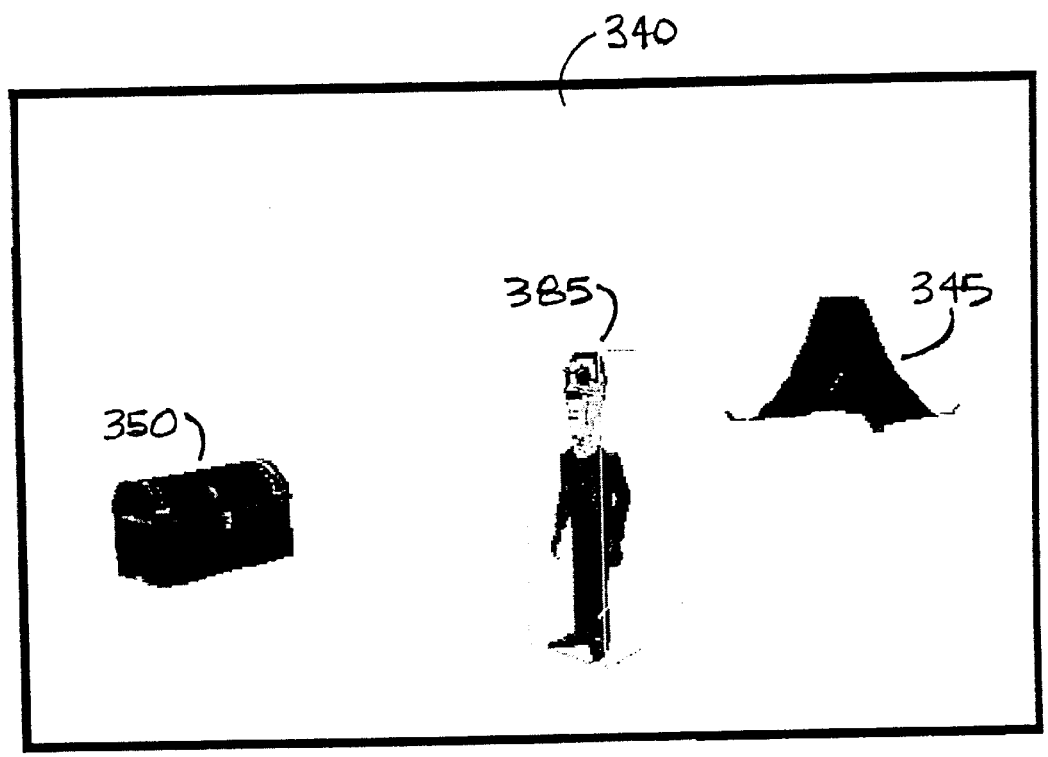

FIG. 4b illustrates the actor 385 at a second point along a curved path toward the front left side of the display. As the actor's path curves to the left, the actor's orientation also rotates toward the left side of the scene.

Figure 4C:
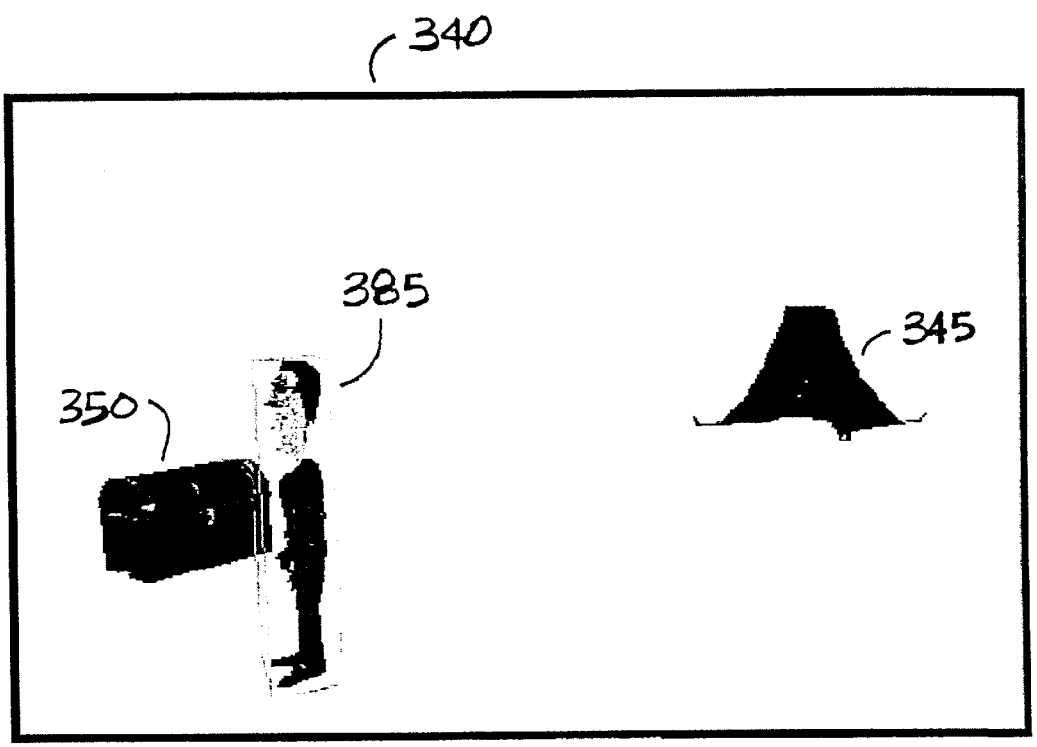

FIG. 4c illustrates the actor 385 at the desired position toward the front left side of the display. Again, as a result in the change in the direction of the path, the actor's orientation has changed so that the actor 385 faces almost directly toward the left side of the scene.

Figure 4D:
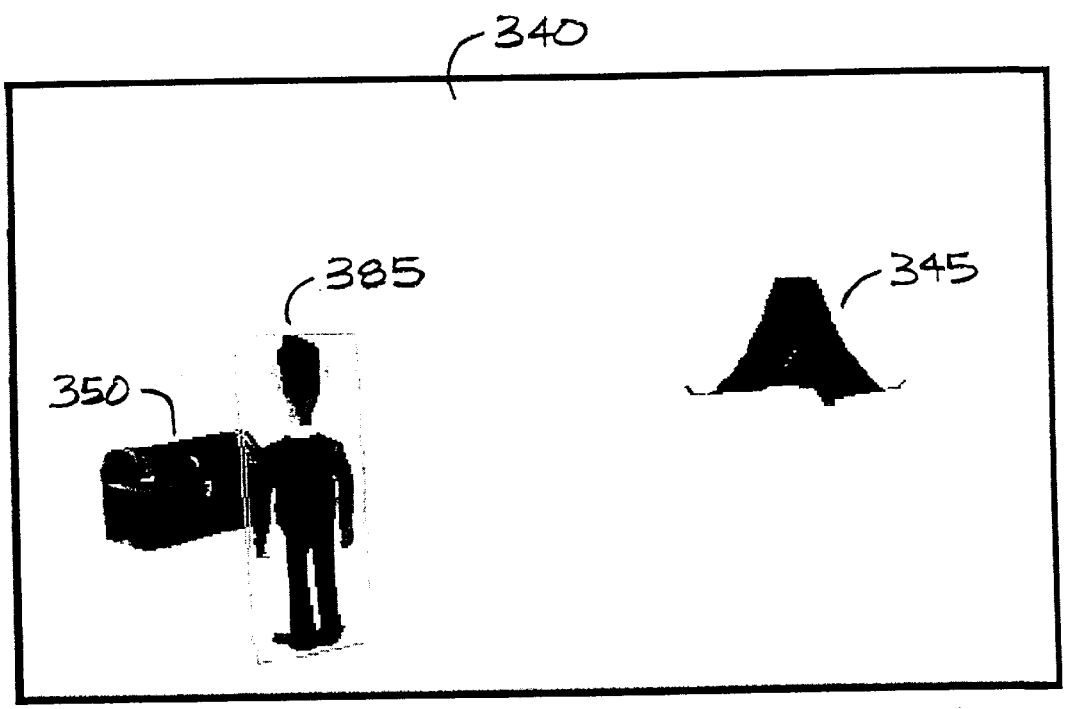
Figure 4E:
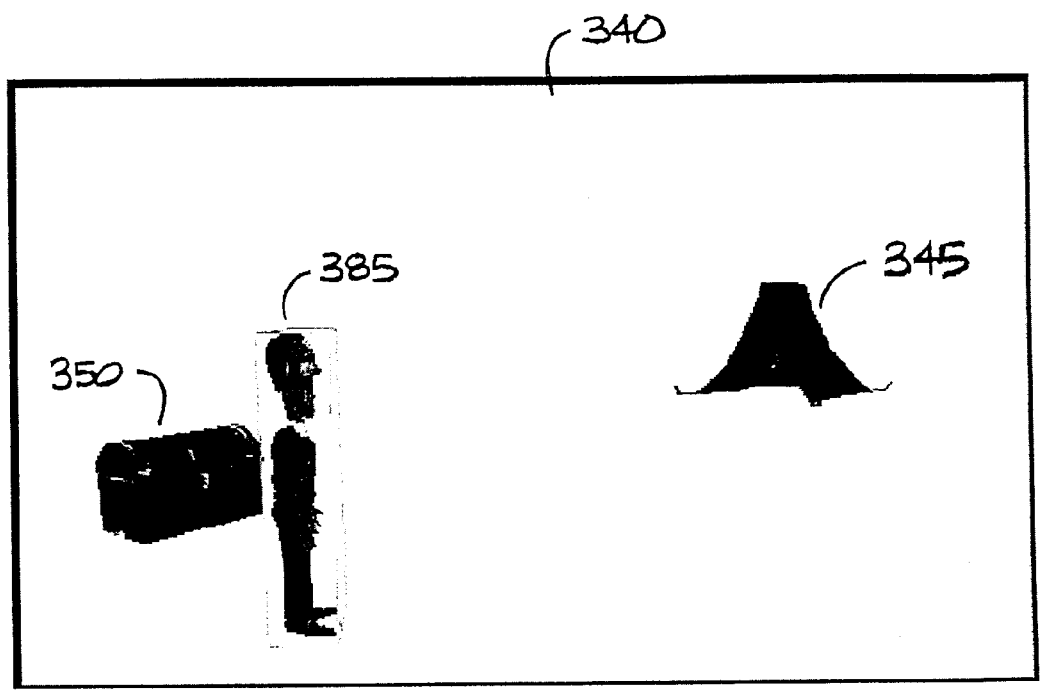

Once the actor is in the desired position, the user may fine tune the actor's rotation to a desired orientation. In the context of this application, fine tuning refers to adjusting the actor's rotation or orientation without also changing the actor's position. This is accomplished by moving the mouse in a circular motion without moving the mouse more than a predetermined number of pixels. FIG. 4d illustrates the actor 385 being rotated clockwise. In FIG. 4e, the actor has finally been rotated so that he is facing the right side of the display.

In summary, the actor 385 has been moved by the user during this placement and orientation process from the center portion of the scene 340, toward the left of the scene 340, then oriented to face the right of the scene 340. After the user is satisfied with the position and orientation of the actor 385, the user "places" the actor 385 by clicking the button on the mouse. An embodiment of a method for placing and orienting an actor is described in greater detail below in conjunction with FIGS. 5–10.

In general, once the actor is placed and oriented in the scene, the content of the movie is recorded. This content includes movement of the actor and actions performed by the actor. To record the content of the movie, the user defines a path along which the actor travels by selecting the actor, selecting an action, and dragging the mouse along the desired path. The actions performed by the actor at specific locations along the path include such actions as walking, running, crawling, or flying. The preferred program also allows users to create events that include background music, sound effects, and spoken phrases. Thus, the preferred application employs another aspect of the present invention to record the content of the movie by recording and storing the 3D location of the path and the actions performed by the actor while traveling along the path.

In order to select the desired action, the user clicks on an "action" button and then clicks on the actor. This results in the displaying of a screen that identifies the preanimated actions that can be performed by the selected actor. Some of the actions are associated with linear movement, such as walking, running, crawling, etc. Others do not typically include movement along a path. These include jumping, dancing, karate kick, etc.

After the user selects the desired action, the preferred application again displays the actor in the scene. At that point, the user uses the mouse to point to the actor. If the user wants the actor to move, the user clicks the mouse button and drags the actor along the desired path. The actor will perform the selected action while he is moving. If the actor is stationary, the user simply points to the actor and clicks and holds the mouse button without moving the mouse. This results in the actor performing the desired action without moving from his original position.

Figure 5A:
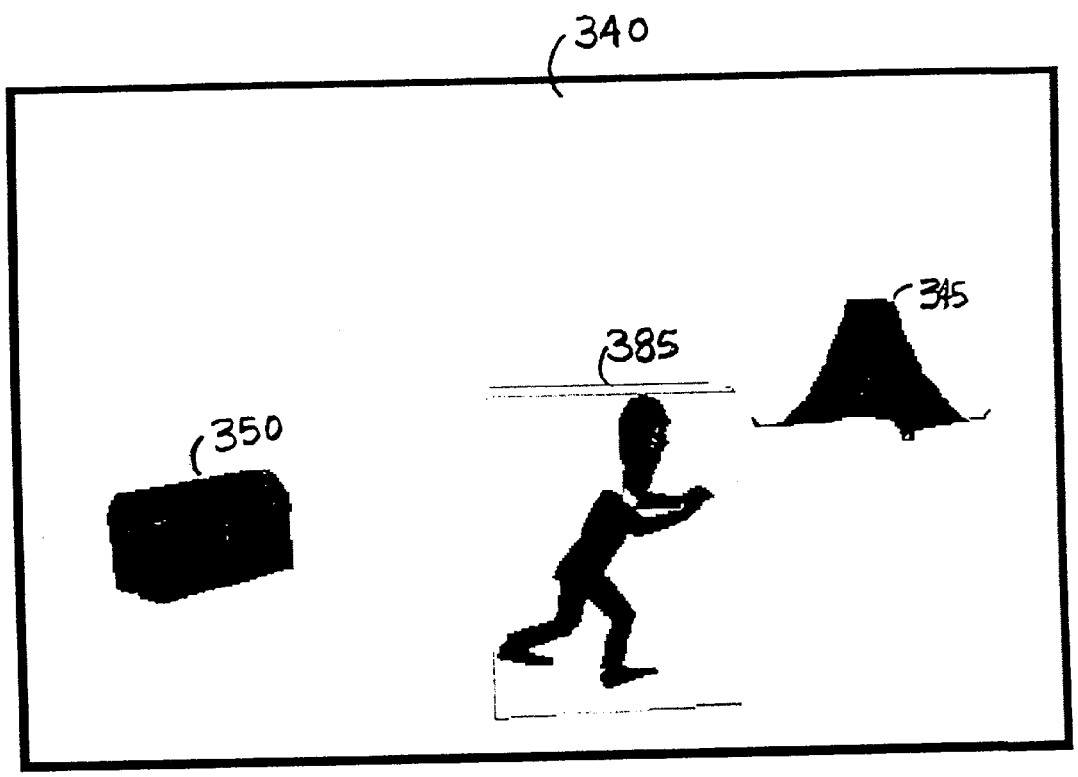
FIG. 5, consisting of FIG. 5a and FIG. 5b, is an illustration of the screen displays associated with recording a path and actions associated with an actor.
Figure 5B:
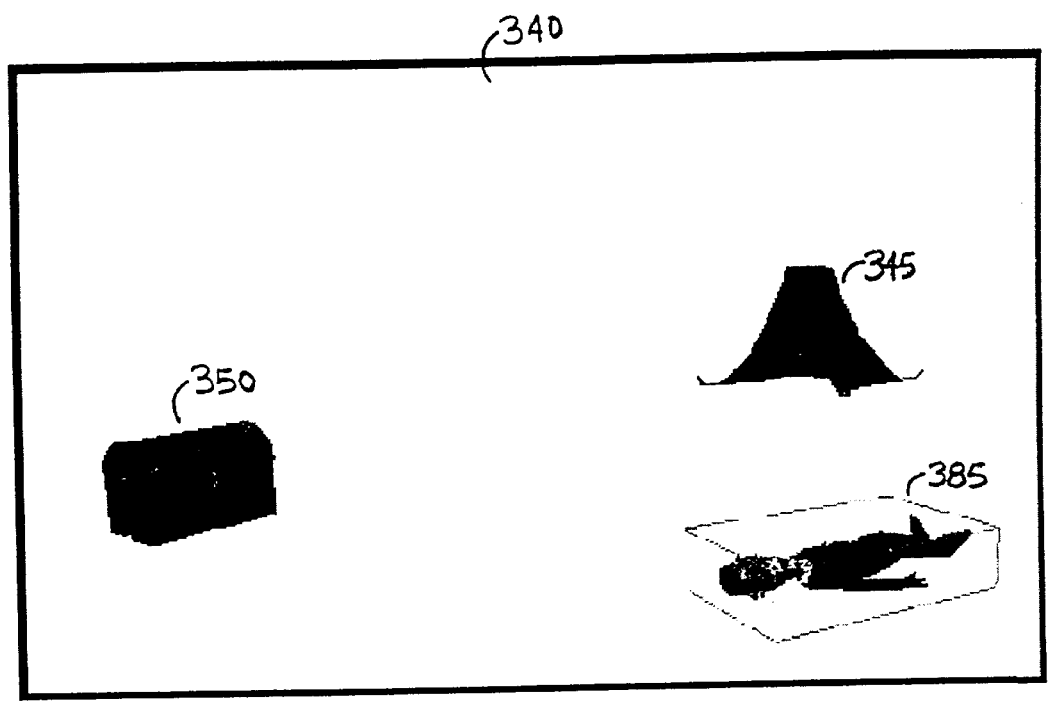

FIGS. 5a and 5b depict screen displays that illustrate the process of recording the movie or animation sequence. FIG. 5a is an illustration of the actor 385 running from the left side of the scene 340 to the right side of the scene 340. This is accomplished by selecting the "Running" action and dragging the actor 385 across the scene 340. As the actor 385 travels along the path designated by the user's movement of the mouse, the actor 385 performs the selected animated action.

As mentioned above, not all actions are performed or recorded when the actor 385 is moving along the path. In some situations, the actor 385 performs the action while stationary at a point along the path. FIG. 5b shows the actor 385 falling down in the scene 340. After the user selects the "Falling Down" action, the user selects the actor 385 and holds down the mouse button without dragging the mouse. The preferred program recognizes the lack of movement of the mouse and responds by rendering and recording the selected action (falling down) of the actor 385 over time while the actor 385 is stationary.

In summary, the content of the movie is recorded by storing the path of the actor and associated actions performed by the actor at specific locations along the path. If the actor is stationary while performing an action, the preferred application records the content of the movie by storing the action of the actor at a point along the path along with the amount of time the action is performed. The content is stored and can later be edited to change what actions are performed during the movie while preserving synchronization of the movie sequence. FIGS. 13–19 describe in more detail an embodiment of a method for recording the path and actions of an actor.

As previously mentioned, the preferred program provides a variety of preanimated actions that can be performed by each actor. An exemplary action performed by the actor is a change in appearance or costume of the actor.

Figure 6:
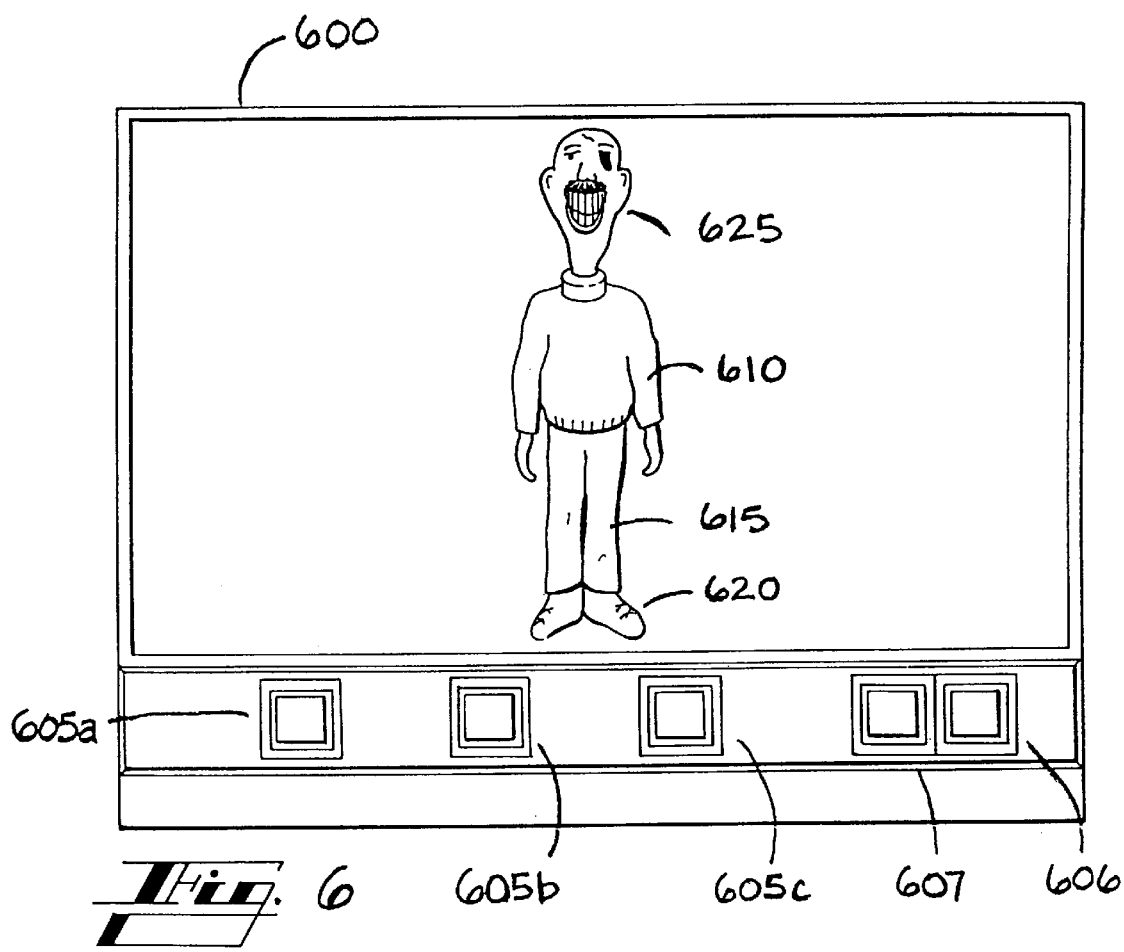
FIG. 6 is an illustration of the costume changer dialog screen display for the program forming the preferred embodiment of the present invention.

FIG. 6 is an illustration of a costume changer dialog 600 for the preferred program. The costume changer dialog 600 is displayed when the user desires to change the costume of an actor 385. Referring now to FIG. 6, the costume changer dialog 600 has several related selection buttons 605a–c which are used when changing costumes.

In the preferred program, a "Costume Selection" button 605a is first selected by the user to change a costume, such as the shirt 610, pants 615, shoes 620, or facial features 625 of the actor 385. After selecting the "Costume Selection" button 605a, the user positions and clicks the mouse on the part of the actor 385 having the costume. By this single user interface operation, the costume on the desired part of the actor 385 is changed. Repeatedly clicking on the same part of the actor 385 results in cycling through a group of available costumes for that part of the actor.

In the preferred embodiment, if the user desires to place a hat (not shown) on the actor 385, a "Hat Selection" button 605b is selected to display the shape of a hat on the actor 385. Additionally, if the user desires to view the actor 385 from a different perspective (rear, side, top, or front), a "View Selection" button 605c is selected.

When all costume changes have been made, an "OK" button 606 is selected. The actor 385 is then displayed in the scene 340 with the changed costume. However, if no costume change is desired, the user may depress a "Cancel" button 607 to leave the costume changer dialog 600 and return to the scene 340 with the same costume. FIGS. 20–24 describe in more detail an embodiment of a method for easily changing the costume of an actor 385.

THE PREFERRED EMBODIMENT OF THE PRESENT INVENTION

In light of the foregoing general description of the operation of the preferred program, the various aspects of the present invention will now be described in detail. These aspects include 3D placement and orientation of the actor, a location based path and event model, and a simplified costume changer.

3D Placement and Orientation

An aspect of the present invention provides an intuitive and efficient method for simultaneously placing and orienting an object in 3D space. In particular, the preferred embodiment utilizes 2D input from a mouse to control an actor in three dimensions, including the position in the x-z (horizontal) plane and the orientation about the y axis. In the context of the preferred program, the invention is used to place and orient the actor in a scene, and to record the actions or movements that form a part of the movie once the character has been initially placed. As explained above, when the user selects an actor from the choices presented in the actor browser, the actor is displayed in the center of the selected scene and oriented toward the user. The placement and orientation features of this aspect of the present invention allow the user to easily reposition and reorient the actor before beginning to record the scene. This process is illustrated in the example of FIGS. 4a–e, in which the actor 385 is moved from the initial position (FIG. 4a) forward and toward the left side of the scene (FIG. 4c) and rotated (FIG. 4d) to face the right side of the scene (FIG. 4e). In the preferred program, the user clicks the mouse button to indicate that the actor is in the desired position and orientation. The manner in which this aspect of the present invention facilitates the placement and orientation of the actor is described in more detail below.

Those skilled in the art will understand that the preferred program uses two-dimensional (2D) input from a mouse or other input device to place and orient a 3D object (i.e., the actor) in a 3D rendering environment. As illustrated in FIG. 4a, movement along the x-axis moves the actor right or left. The z-axis corresponds to forward/backward movement, and the y-axis corresponds to up and down movement. A fourth dimension includes rotating the actor about the y-axis.

During the placement and orientation process, the preferred program places the actor on a plane. Initially, the plane is at "ground level" with respect to the y-axis. However, the plane that determines the actor's elevation is user-defined and can be adjusted at any time by using the up and down arrow keys. The 2D input from the mouse is used to control the actor's position along the x-axis and z-axis. The 2D input from the mouse is also used to control the actor's orientation or rotation about the y-axis. Thus, the 2D input from the mouse is used to control the actor in three dimensions, which include the position along the x-axis, the position along the z-axis, and the orientation about the y-axis.

Those skilled in the art will appreciate that using the 2D mouse input both to place the actor in the x-z plane and to orient the actor about the y-axis is in effect an attempt to solve a 3D problem using two-dimensional input. This is problematic because movement in three dimensions is not well defined by simple 2D mouse input. Specifically, with 2D input, it is potentially ambiguous whether each input from the mouse indicates an intent on the part of the user to move the object in space, without rotation, or an intent to rotate the object in place. The placement and orientation aspect of the present invention provides an efficient, natural and easy-to-use interface for users to manipulate 3D objects without requiring additional types of input (e.g., right/left arrow keys) or mouse clicks.

The placement and orientation aspect of the present invention is predicated on the assumption that there are natural and canonical user expectations associated with mouse dragging and that these expectations can be realized to create a natural and easy-to-use interface. More particularly, this aspect of the present invention controls the orientation of the actor on the basis of assumptions regarding the relationship between the position and speed indicated by the 2D input and the desired position and orientation of the actor. The orientation calculations are based on the distance moved between successive mouse coordinate points and the angle between the last two line segments that are formed by those points. These underlying assumptions and relationships are described in more detail below.

Figure 7:
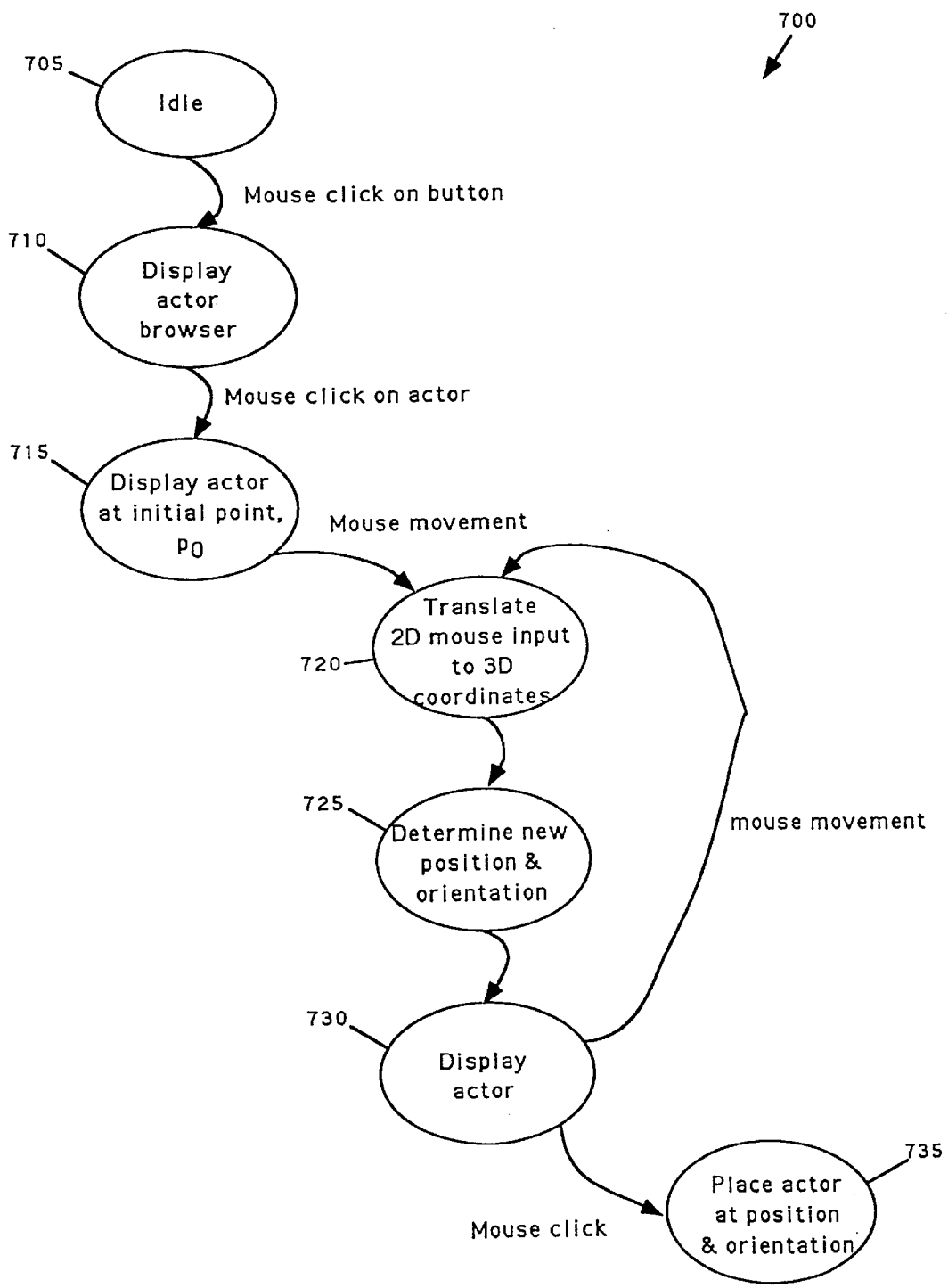
FIG. 7 is a state diagram illustrating the preferred method for selecting an actor and for placing and orienting the actor in a scene.

Before describing the details of the placement and orientation aspect of the present invention, it is helpful to review the general steps associated with placing and orienting an actor in the preferred program. FIG. 7 is a state diagram 700 that illustrates the general steps associated with positioning and orienting an actor prior to recording the movie. From the idle state 705, the program displays the actor browser (state 710) in response to a click of the mouse button while the cursor is positioned over the "actor." When the user clicks on the desired actor, the method proceeds to state 715 and displays the actor at the predetermined initial position and in the initial orientation. As mentioned above, the actor is initially placed in the approximate center of the screen and oriented toward the user.

Once the actor has been selected and displayed at the initial point, any mouse movement will result in a change in the position and/or orientation of the actor. As described above, the mouse data is provided to the program by the operating system in the context of a WM_MOUSEMOVE message. At state 720 the 2D mouse position data from the operating system is translated into 3D coordinates that correspond with the displayed scene. In the preferred embodiment, the actor's x and z coordinates are obtained by scaling the mouse's directional movement. Those skilled in the art will understand that there are various ways to translate mouse coordinates into three dimensions and that the placement and orientation aspect of the present invention is not dependent on the particular technique used.

Once the current mouse coordinate is translated into the 3D coordinate system, the method proceeds to state 725 and determines the new position and orientation of the actor. At state 725 the method uses successive input points (x, y, z) in 3D space to produce a display point (xd, yd, xd) and an orientation Od with respect to the vertical axis for the next rendering of the 3D object. This process is described in more detail in conjunction with FIGS. 8–12. After the new position and orientation are determined, the method proceeds to state 730 and displays the actor at the calculated position and in the calculated orientation.

From state 730 the method does one of two things. If the user clicks the mouse button, the method places the actor at the current position and in the displayed orientation and terminates the placement process (state 735). At that point the user may begin to record the movie with the actor starting in the displayed position and orientation. If the user moves the mouse instead of clicking the mouse button, the method returns to state 720 and repeats the process of translating the mouse input into 3D coordinates. From there, the new position and orientation are determined (state 725) and the actor is displayed (state 730).

Figure 8:
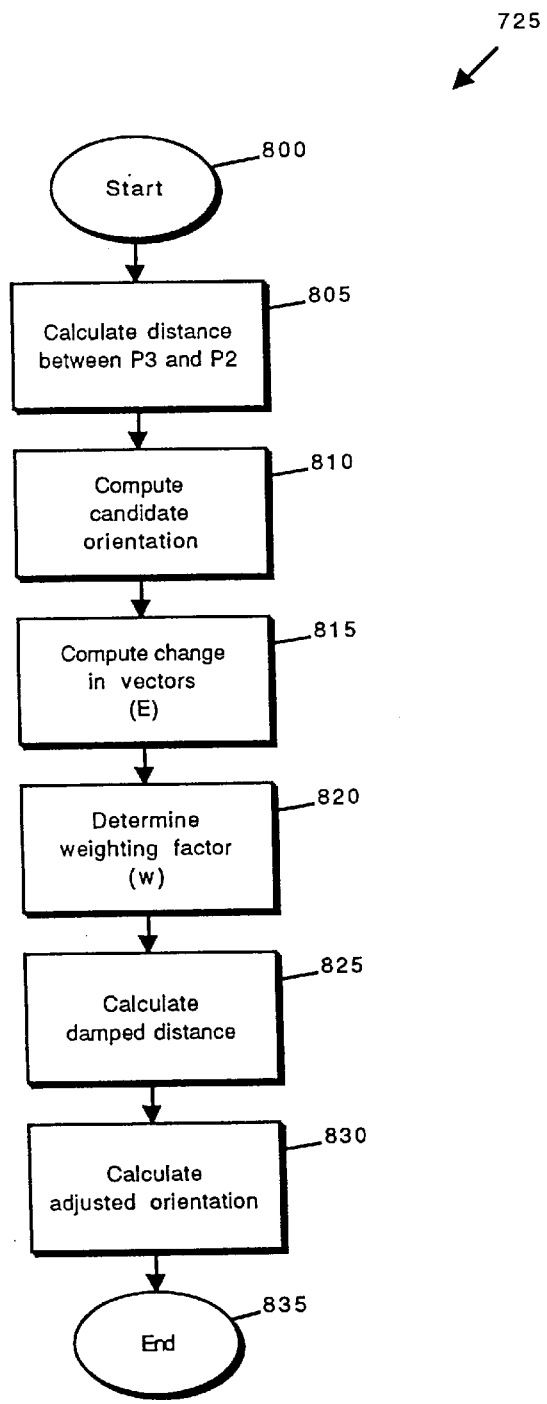
FIG. 8 is a flow diagram of the preferred method for determining a new position and orientation of an actor.
Figure 9:
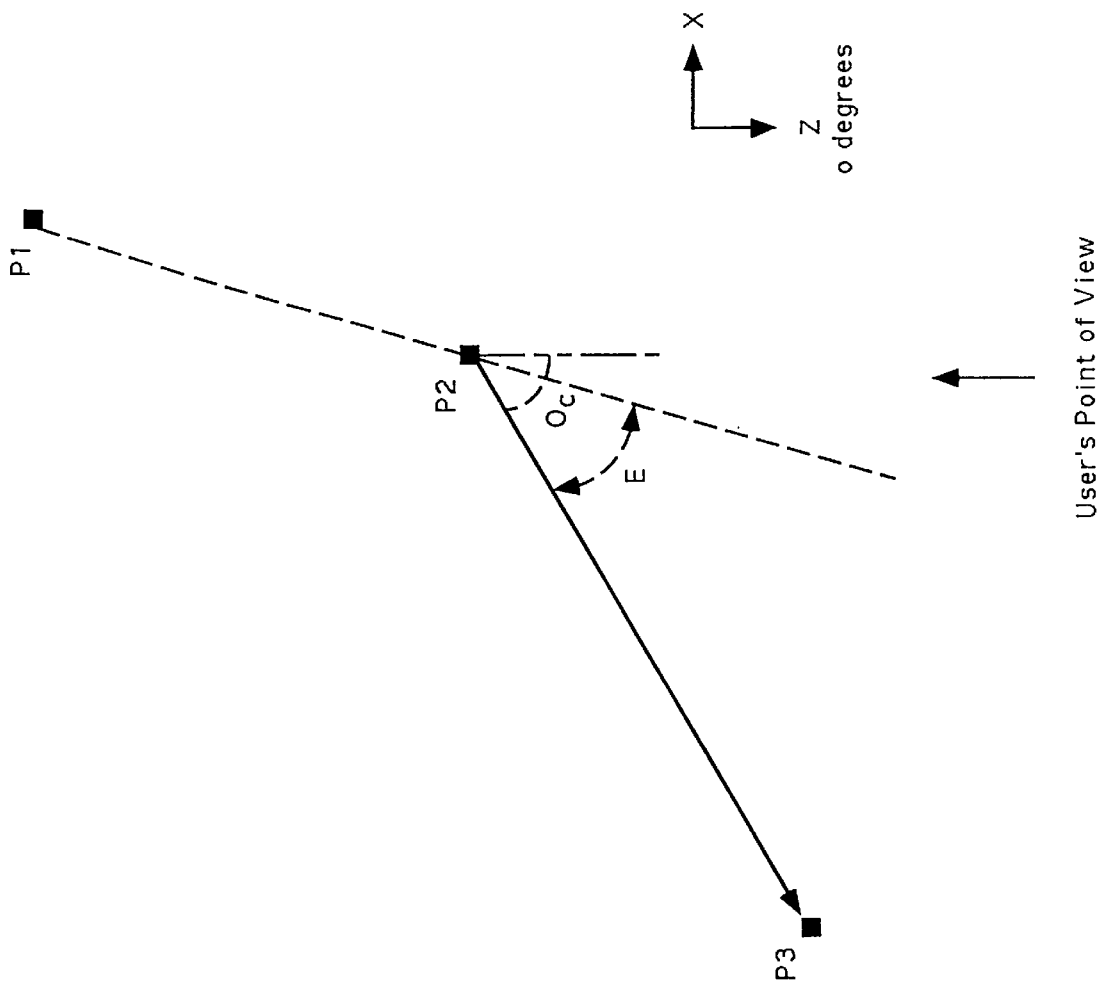
FIG. 9 is an illustration of reference points and angular measurements used by the preferred program for supporting a user's placement and orientation of an actor.

Turning now to FIGS. 8–9, the details of the placement and orientation aspect of the present invention will be described. As mentioned above, this aspect of the present invention relies on a series of assumptions regarding the relationship between the speed and position of the mouse movement and the position and orientation of the actor. These assumptions are essential to the determination of what constitutes an easy and user-friendly interface for simultaneously controlling 3D object positioning and orientation.

The underlying assumptions may be stated as follows. First, objects should face in the direction of the mouse drag. Second, directional change in mouse coordinates should be able to map naturally to a corresponding directional change in 3D space. Third, it is easy and natural for users to initially place an object in space and then finely tune that object's orientation, and both are possible in one smooth operation. Fourth, rapid mouse movement should generate immediate and responsive 3D object positioning and orientation.

In order to provide a simple, efficient user interface that is consistent with the aforementioned assumptions, one aspect of the present invention applies a variety of modifications to the mouse movement. First, this aspect of the present invention smoothes the actor's orientation in order to avoid jerky rotational turns as the actor is dragged across the screen. Second, this aspect of the present invention weights the smoothing of the orientation so that the new orientation is weighted proportionally to the mouse speed. This both allows objects to face in the direction of the drag in immediate response to large mouse movement and enables a fine granularity of control of rotation with small mouse movement, where the movement of the mouse in the x and y directions is within predetermined limits. Third, this aspect of the present invention damps the distance moved in direct proportion to the angular change. This restricts undesirable wandering of the object when the user is fine tuning the orientation of the actor.

FIG. 8 is a flow diagram of a method 725 for determining the position and orientation of the actor. The method 725 forms a part of the method 700 of FIG. 7, and determines the position and orientation of the actor on the basis of current mouse movement. In the 3D world rendered by the preferred program, all objects exist in a 3D coordinate space called "world space." Coordinates for the positions and distances in this world are defined in terms of "world units." Because world space is a representation of physical reality, there is a scale between world units and actual, physical units. In particular, 10 world units equal about 1 meter in the real world. During the process of placing and orienting the actor, one pixel of mouse movement equates to 0.02 world units. When the user is recording a movie and dragging an actor along a path, each pixel of mouse movement equates to 0.2 world units.

In the method 725, point $P_3=(x, y, z)$ represents the current candidate location, i.e. the point in 3-space corresponding to the most recent mouse input. Point P2 denotes the location where the actor is currently displayed. Point $P_1$ denotes the coordinates of the previous point at which the actor had been displayed. In the preferred program, the point $P_1$ is temporarily saved for each location. In the method 725, $O_1=(\alpha_1, \beta_1, \gamma_1)$ represents the orientation the actor had at point $P_1$. $O_2=(\alpha_2, \beta_2, \gamma_2)$ is used to represent the orientation the actor had at point $P_2$. The angular references $(\alpha, \beta, \gamma)$ are absolute references with respect to a fixed reference about the x-axis, the y-axis and the z-axis, respectively. FIG. 9 provides an illustration of these points in the x-z plane.

The method 725 starts at step 800 and proceeds to step 805, where it calculates the distance between point $P_3$ and point $P_2$. At step 810 the method 725 determines the candidate orientation $O_c$ by calculating the directed vector from point $P_2$ to point $P_3$.

At step 815 the method computes E, which is the angular change between the two directed vectors $(P_1, P_2)$ and $(P_2, P_3)$.

At step 820 the method determines a weighting factor w, which is used to weight the orientation smoothing function in proportion to the speed of the mouse travel. The weighting factor w is calculated by the formula $w=k_1* d$, and is bounded between $(k_2, 1)$. In the preferred program, $k_1=\frac{1}{3}$ and $k_2=0.1$. The weighting factor is used below in conjunction with step 830.

At step 825 the method calculates the position at which the actor will be displayed. The calculation damps the distance moved by the actor in direct proportion to the original angular change E, which was calculated at step 815. At step 825 the value $E_t=E$ is bounded between $k_3$ and $k_4$. In the preferred program, $k_3=0.2\pi$ and $k_4=4 * k_3$ (in radians). The distance between the point $P_2$ and the displayed point $P_3'$ is determined by $$E_T=E, \text{ bounded between } k_3 \text{ and } k_4, \text{ where}$$

$$k_3=0.2\pi \text{ and } k_4=4*k_3 \text{ (if in radians).}$$

$$D=D * (k_3/E_T)$$

Similarly, the change in the x, y, and z coordinates of point $P_3$ are recomputed by $$\Delta x=\Delta x * (k_3/E_T),$$

$$\Delta y=\Delta y * (k_3/E_T), \text{ and}$$

$$\Delta z=\Delta z * (k_3/E_T).$$

Once the position of displayed point $P_3'$ is calculated at step 825 the method determines the actual orientation of the actor at that point. This is accomplished by calculating a weighed average of $O_2$ and $O_3$ using the following formula:

$$O_3=(w*O_3)+((1-w)*O_2)$$

for w defined at step 820. Those skilled in the art will appreciate that the angles $(\alpha, \beta, \gamma)$ of rotation about each axis are separately smoothed by this formula.

Once the position $P_3'$ and the corresponding orientation $O_3$ are determined, the method 725 terminates at step 835. As illustrated in FIG. 7 this data is then used to display the actor at state 730 of method 700. At that point, the object is displayed at the location of the modified point $P_3'=(x, y, z)$ with the modified orientation $O_3$.

In summary, the effect of the calculations performed by method 725 are as follows. First, the preferred value for $k_1$ results in the new orientation being observed exactly when the mouse speed generates a distance larger than 3 units. Thus, the weighting factor w (step 820) assures rapid response to rapid mouse movement. Similarly, calculating the weighted average at step 830 enables the user to control rotation with fine granularity. Calculating the damped distance at step 830 prevents significant object wandering during orientation. Those skilled in the art will appreciate that the effects of these steps combine to provide the desired effect. The combination of effects is more important to the outcome than the particular type of damping (i.e., linear or non-linear) that is used in the equations.

Referring still to FIGS. 8–9, the following scenarios illustrate the combined effects of these calculations. These effects are also illustrated in the diagrams of FIGS. 10–12.

Large Distance, Large Angle: The mouse is moving fast, turning sharply. Step 820 counteracts step 830 to allow the object to immediately face the current direction of the mouse drag. Step 825 ensures that the distance is damped due to large E. The visible result is that the 3D object momentarily pauses and turns.

Large Distance, Small Angle: The mouse is moving fast with little angular change. As above, steps 820 and 830 guarantee that the rotation tracks the mouse movement exactly. Step 825 guarantees that the distance moved is not damped. The result is that the 3D object accurately tracks both the speed and orientation of the rapid mouse movement.

Small Distance, Large Angle: The mouse is moving slowly with large angular change: The combination of steps 820 and 830 allow smoothed rotation control. Step 825 brings mouse movement to a near grinding halt. The assumption is that the user has correctly placed the 3D object in space and is now adjusting the object's orientation. The severe damping of distance allows the user to continue to rotate the object without significantly moving the object from the location where it is positioned.

Small Distance, Small Angle: As above, rotation is smoothed for fine granular rotation control. The user is fine tuning the object's orientation.

Note that rapid mouse action generates rapid response. If the mouse is abruptly dragged in a new direction, the first time the innovation is invoked, the object will stop and turn. During subsequent movement, step 820 ensures that the object will be oriented in the direction of the mouse drag and will move at full speed. Note that without step 820, the object would not face in the direction of the drag for considerable distance.

FIGS. 10–12 provide illustrations of the output points provided by the placement and orientation aspect of the present invention for a series of mouse coordinates. In the illustrations of FIGS. 10–12, it is assumed that the actor's vertical position (along the y-axis) is fixed and that the actor's movement takes place in the plane defined by the x-axis and z-axis. The actor's orientation or rotation takes place about the y-axis. In these figures, P0 represents the original position and orientation of the actor after the actor is selected from the actor browser. At this point, the actor is facing the user (0 degrees). The square elements (P1, P2, etc.) represent the input coordinates (or candidate positions) that are derived from the mouse input (FIG. 7, state 720). The arrows associated with each of the coordinates indicates the angular orientation of the vector drawn to that point from the preceding point. The round elements (P1', P2', etc.) represent the actor's positions and corresponding orientations that are displayed as a result of the method described in conjunction with FIG. 8. Those skilled in the art will appreciate that where the square and round elements are shown immediately adjacent each other, they are intended to represent the same position in the x-z plane.

In addition to the plots of the actor's actual position and orientation versus mouse input coordinates, FIGS. 10–12 each include charts (FIGS. 10b, 11b, and 12d) that illustrate the calculations performed by the placement and orientation aspect of the present invention. Each column is defined below. In this description, let $p_n$ represent the current input candidate location (i.e., the point corresponding to the most recent mouse input), $p_{n-1}'$ represent the location where the actor is currently being displayed, and $P_{n-2}'$ represent the saved location where the actor had previously been displayed.

| Column Title | Description |
| --- | --- |
| P | The point on the graph that is associated with the figures in that row |
| Candidate Position | The current input coordinates associated with the mouse input (see FIG. 5, state 520) |
| Δx | The difference along the x-axis between the candidate position ($P_n$) and the current displayed position ($P_{n-1}'$) |
| Δz | The difference along the z-axis between the candidate position ($P_n$) and the current displayed position ($P_{n-1}'$) |
| Distance | The distance between the candidate position ($P_n$) and the current displayed position ($P_{n-1}'$) (see FIG. 8, step 805) |
| $O_c$ | The candidate orientation as defined by the vector between the current displayed position ($P_{n-1}'$) and the candidate position ($P_n$) (see FIG. 8, step 810) |
| E | The angular change between the vector ($P_{n-2}'$, $P_{n-1}'$) and the vector ($P_{n-1}'$, $P_n$) (FIG. 8, step 815) |
| w | The weighting factor, which depends on the distance traveled by mouse (FIG. 8, step 820) |
| $E_t$ | The bounded angular change. $E_t$ = E bounded between the values of $k_3$ and $k_4$ (FIG. 8, step 820) |
| $K_3/E_t$ | The value of the variable $K_3$ divided by the value of $E_t$ |
| D | The damped distance between $p_{n-1}'$ and the next point that will be displayed (FIG. 8, step 825) |
| x' | The x coordinate of the damped position of the actor (FIG. 8, step 825) |

| Column Title | Description |
| --- | --- |
| z' | The z coordinate of the damped position of the actor (FIG. 8, step 825) |
| O' | The modified orientation angle of the actor (FIG. 8, step 830) |

FIGS. 10 and 11 illustrate sequences of the positions and orientations of actors that are originally facing the user, and then moved directly away from the user along the z-axis. In FIG. 10, the movement along the z-axis is fairly quick. In FIG. 11, the movement along the z-axis begins slowly and increases speed.

Figure 10A:
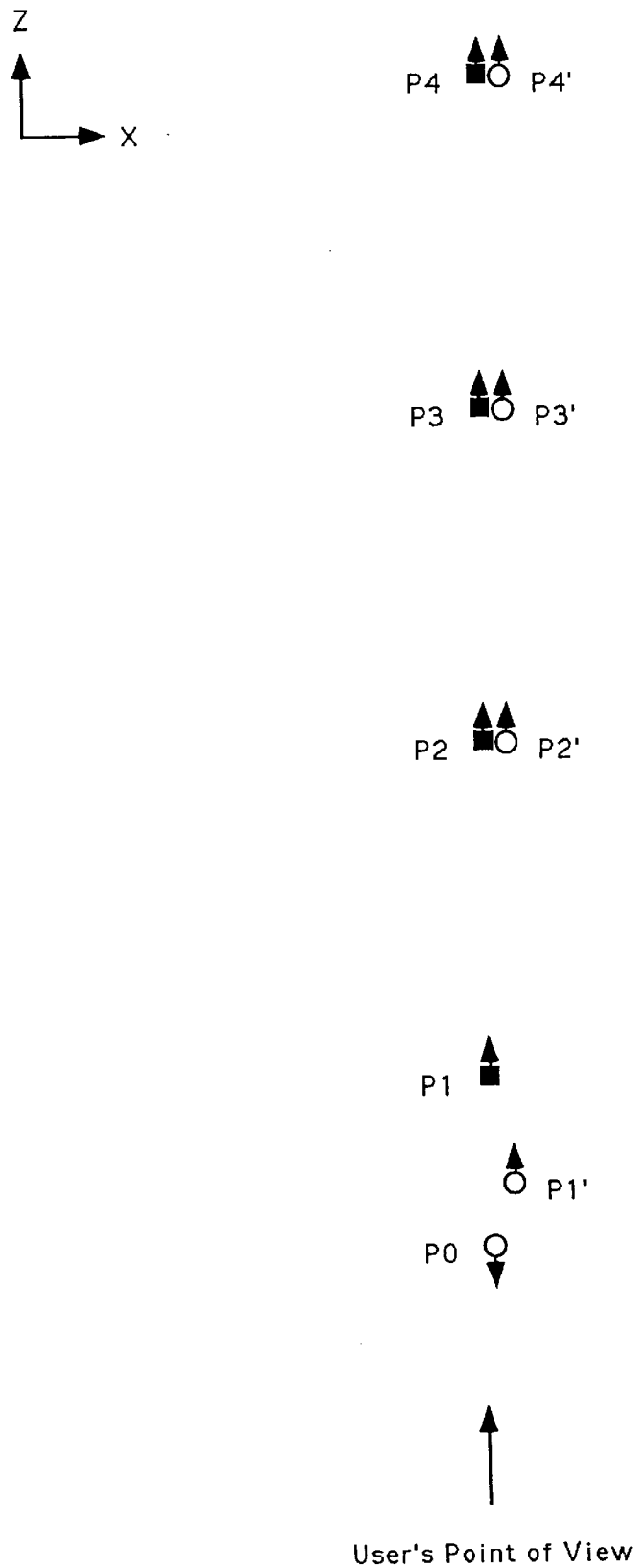
FIG. 10, consisting of FIG. 10a and FIG. 10b, is an illustration of the calculations completed by the preferred method for determining the new position and orientation of the actor.

In FIG. 10, the actor's orientation at initial position P0 is 0 degrees. Returning to FIG. 8 and FIG. 10, the candidate position P1 is five units from initial position P0, and the candidate orientation and angular change E are 180 degrees. The large angular change results in the next display point P1' being at a damped distance of 1.25 units instead of the distance of five units to the candidate position. The large distance between initial point P0 and candidate point P1 result in the displayed orientation being 180 degrees. The relationship of P0 to P1 corresponds to the scenario defined above as having a large distance and a large angle. As stated above, step 820 counteracts step 830 to allow the object to immediately face the current direction of the mouse drag, and step 825 guarantees that the distance is damped due to large E. The visible result is that the 3D object momentarily pauses and turns. This is illustrated in FIG. 10a by the point P1'.

From point P1' to candidate point P2, the distance is 13.75 units and the angular change (between the vectors (P0, P1') and (P1', P2)) is zero. This example corresponds to the scenario described above as large distance and small angle. In this case, steps 820 and 830 guarantee that the rotation tracks the mouse movement exactly. Step 825 guarantees that the distance moved is not damped. The result is that the 3D object accurately tracks both the speed and orientation of the rapid mouse movement. This same scenario applies to the remaining points in FIG. 10a.

In FIG. 11, as in FIG. 10, the actor beings at P0 facing the user and moves directly away from the user. However, the actor initially moves at a slower rate. From initial point P0 to candidate point P1, the distance is 1 and the angular change is 180 degrees. The large angular change results in the distance to displayed point P1' being damped to 0.25 instead of 1. Furthermore, the short distance results in the weighting factor w being small and the angular change being damped. The result is that displayed point P1' is at position z=0.25 with an orientation angle of 60 degrees. This corresponds to the scenario described above as small distance, large angle. In such a case, the combination of steps 820 and 830 allow smoothed rotation control. Step 825 brings mouse movement to a near grinding halt. The assumption is that the user has correctly placed the 3D object in space and is now adjusting the object's orientation. The severe damping of distance allows the user to continue to rotate the object without significantly moving the object from the location where it is positioned.

From displayed point P1' to candidate P2, the distance is 1.75 and the angular change in the direction of movement is 0 degrees. The small angular change results in the distance to displayed point P2' not being damped. As in the previous case, the small distance results in the orientation being damped. The result is that displayed point P2' is at position z=2 (the same as candidate point P2) with an orientation angle of 130 degrees.

The following points P3', P4', P5', and P6' demonstrate the same effects being repeated. In each case, the orientation is damped but the distance is not. The actor's orientation does not reach 180 degrees until displayed point P6'.

Figure 12A:
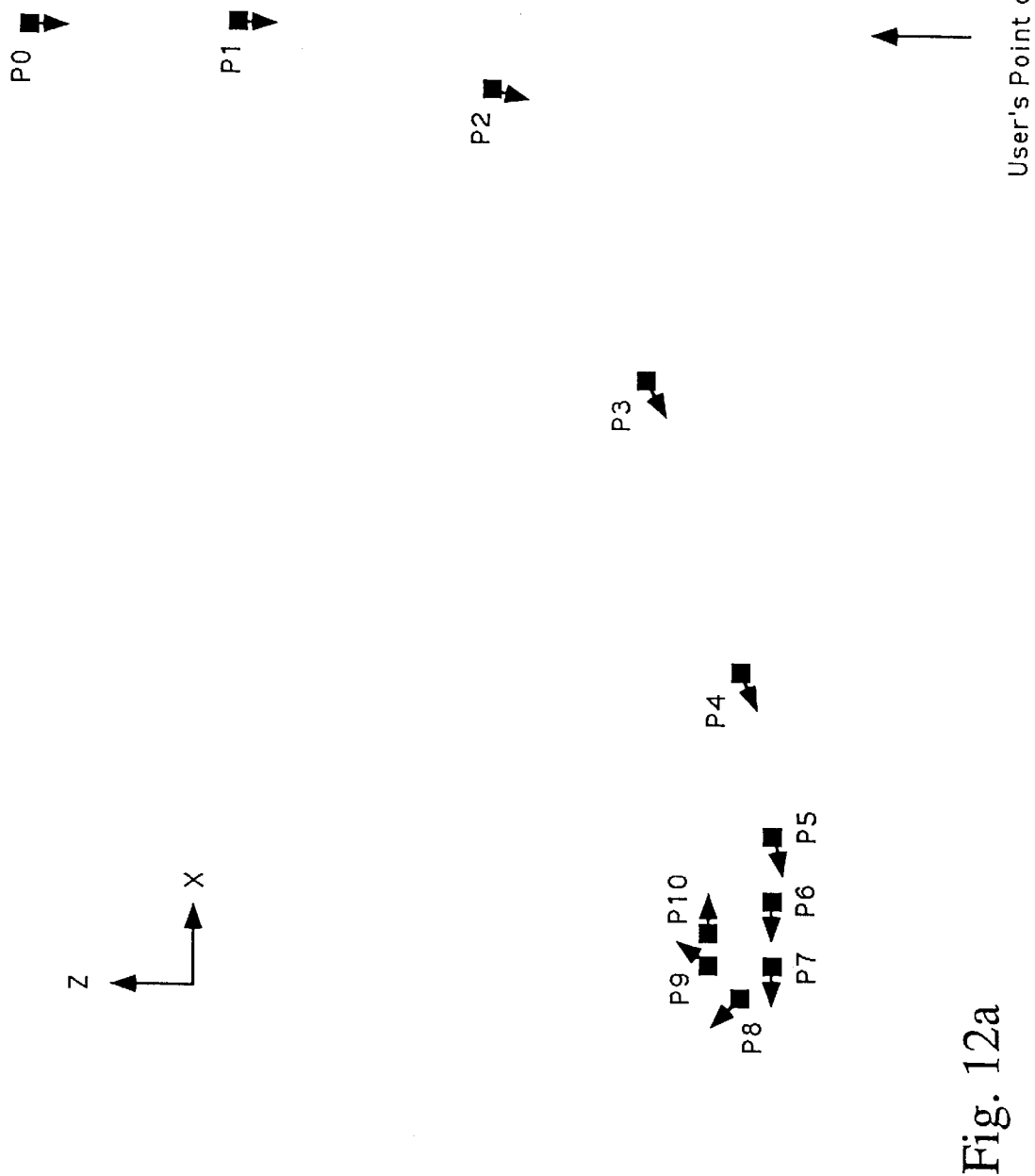
FIG. 12, consisting of FIGS. 12a–12d, is an illustration of the calculations resulting from the preferred method for determining the new position and orientation of the actor.

FIGS. 12a–d illustrate the movement of an actor along a path similar to that depicted in FIG. 4. In this case the actor begins at initial point P0 facing the user. From there, the actor moves forward toward the user and over toward the left side of the screen. Once the actor arrives at the left side of the screen, the actor is rotated to face to the right. FIG. 12a illustrates the entire path represented by the mouse input points. FIGS. 12b and 12c are magnified versions of two portions of the path and also illustrate the displayed positions and corresponding orientations. FIG. 12d is a chart showing the calculations that correspond to the mouse input points of FIG. 12a.

Referring now to FIG. 8 and FIG. 12, from initial point P0 to candidate point P1, the actor is traveling a large distance with no angular change. As discussed above, steps 820 and 830 guarantee that the rotation tracks the mouse movement almost exactly. Step 825 guarantees that the distance moved is not damped. The result is that the 3D object accurately tracks both the speed and orientation of the rapid mouse movement.

From point P1' to candidate point P2, the actor travels a large distance with a small angular change. This also results in the actor accurately tracking both the speed and orientation of the mouse movement.

From point P2' to candidate point P3, the actor is traveling a large distance with a large angular change. In this case, step 820 counteracts step 830 to allow the object to immediately face the current direction of the mouse drag. However, step 825 causes the distance to be damped due to the large angular change. The visible result is that the 3D object momentarily pauses and turns. This is illustrated in FIG. 12b.

From point P3' to candidate point P4, the actor is traveling a large distance with a small angular change. As in the earlier cases, steps 820 and 830 guarantee that the rotation tracks the mouse movement almost exactly. Step 825 guarantees that the distance moved is not damped. The result is that the 3D object accurately tracks both the speed and orientation of the rapid mouse movement.

From point P4' to candidate point P5, point P5' to candidate point P6, and point P6' to candidate point P7, the actor is traveling a large distance with a small angular change. As above, this results in the position and orientation of the actor accurately tracking the mouse movement.

From point P7' to candidate point P8, the actor is traveling a moderate distance with a moderate angular change. In this case, the angular change results in the distance traveled being slightly damped. Similarly, the distance traveled results in the orientation being slightly damped. This is illustrated in FIG. 12c.

From point P8' to candidate point P9, the actor again moves a moderate distance with a fairly large angular change. In this case, the distance traveled causes the orientation to be slightly damped. The fairly large angular change results in the distance being fairly severely damped. This is illustrated in FIG. 12c.

Finally, from point P9' to candidate point P10, the actor travels a fairly large distance with a moderate angular change. As in earlier cases, the distance traveled results in the orientation being identical to the vector from P9' to P10. Likewise, the small angular change results in the distance not being damped.

From the foregoing description and illustrations, those skilled in the art will appreciate that the placement and orientation aspect of the present invention provides a straightforward, convenient user interface for placing and orienting an actor or other object in 3D space. This aspect of the present invention smoothes the object's orientation to avoid jerky rotational turns as the object is dragged across the screen. This aspect of the present invention also weights the smoothing so that the new orientation is weighted proportionally to the mouse speed. This allows objects to face in the direction of the drag in immediate response to large mouse movement and enables a fine granularity of control of rotation with small mouse movement. In addition, this aspect of the present invention damps the distance moved in direct proportion to the angular change. This restricts undesirable wandering of the object when fine tuning the rotation. Those skilled in the art will understand that variations in these features are possible. The preferred implementation requires that only one prior point be stored. Likewise, the constants may be altered to provide various results. The combination of these features provides a very effective, natural user interface.

Location-based Model for Recording Events

Another aspect of the present invention provides a location-based system and method for storing a path traversed by an actor and the events and actions that are executed as the actor traverses the path. As described earlier, the preferred program requires a user to select a setting or scene for a movie and then select the actor or actors that are going to be in the movie. Once an actor has been selected and placed in a scene, the user can select actions for execution by the actor and define the path along which the actions are executed. In order to define the path, the user must record the path by directly manipulating the actor in 3D space using the mouse. While the actor is traversing the path, it can execute a series of events that modify the behavior or appearance of the actor in some way. The prior art relies on a strict temporal-based method of storing the path and event data, in which the actions and events are associated with a certain frame of the movie. Although this works well when initially recording the action, it presents unexpected results when editing an movie. The present invention enhances the editing process by separately storing the actions and events to be performed and associating them with the location of the actor along the path.

A 3D movie or animated sequence of images, like any other linear story, has the concept of time associated with it. A frame in the preferred program represents a snapshot of the scene, actors, etc., in time as it would in an actual film. A movie is replayed by replaying all the events for each frame in each scene. The preferred program provides preanimated actions (e.g., walking, running, dancing, jumping) for each actor. FIGS. 5a and 5b illustrate an actor performing two preanimated actions. In FIG. 5a, the actor 385 is running as he moves across the screen. In FIG. 5b, the actor 385 has completed the fainting action after arriving at a point toward the right side of the screen.

Those skilled in the art will appreciate that any of the preanimated actions may be performed while the actor is stationary or non-stationary, and that the actor's movement or change in position is determined solely by the mouse. However, those skilled in the art will also appreciate that preanimated actions are canonically stationary or non-stationary, i.e., some preanimated actions have the concept of forward motion associated with them, while others do not. For example, each frame in the preanimated sequences for running, walking, crawling, etc. is associated with moving a predetermined distance. Stationary actions such as jumping, dancing, fainting, etc. do not have the concept of forward motion associated with them.

When a stationary actor performs any action, it is recorded with reference to time. When a moving actor performs any action, it is recorded with reference to the actor's position. When a moving actor performs a non-stationary action (e.g., running, walking), the program displays the actor's movement in accordance with non-zero cell distances associated with each cell in the preanimated sequence. These cell distances are appropriate for the type of action being performed. When a moving actor performs a stationary action (e.g., jumping, spinning), the program imposes a contrived "floating speed" and displays the actor's movement in accordance with this constant, non-zero speed.

Figure 13:
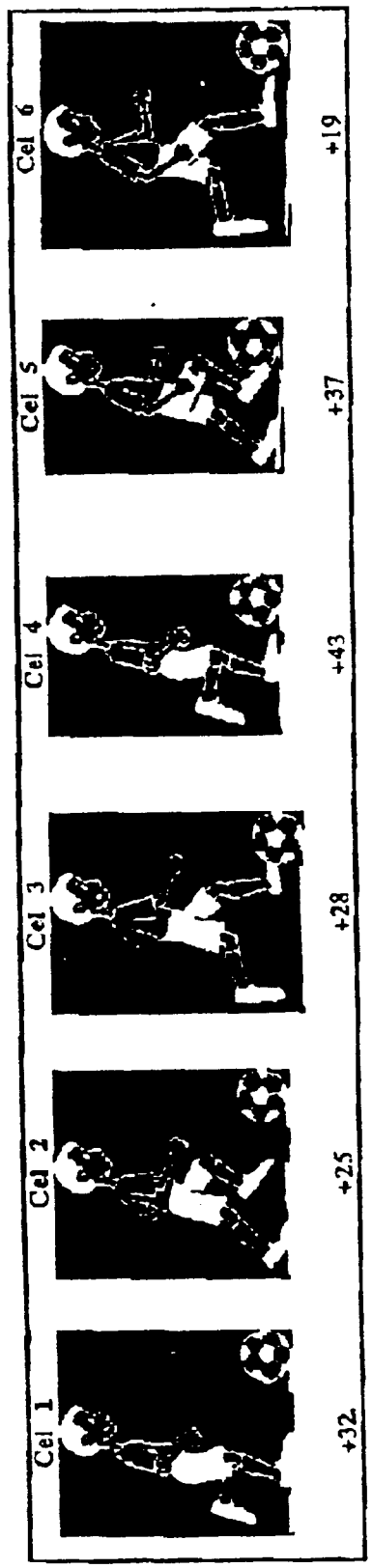
FIG. 13 is an illustration of a series of animated images associated with an action performed by an actor.

FIG. 13 illustrates a preanimated sequence for an actor dribbling a soccer ball. Those skilled in the art will appreciate that in order to give the appearance that the actor is running, this sequence of images is repeated as an actor moves across the screen. In the case of non-stationary actions, the action is typically performed as the user moves the actor along the desired path by dragging the mouse. Each frame or cell is associated with a predetermined distance related to the movement of the actor. In FIG. 13, these distances appear below each frame in the sequence and represent mouse pixels. As mentioned earlier, each mouse pixel represents approximately 0.2 world units. Thus, when the actor is moving, cell 2 will be displayed 32 mouse pixels after cell 1, cell 3 will be displayed 25 mouse pixels after cell 2, etc. Those skilled in the art will understand that the "distance" between each cell is not equal because it corresponds to the distance that an actor would travel during each particular part of his stride.

As illustrated by FIG. 13, with preanimated actions the distance moved is prescribed by the action itself. When the movie is recorded, the direction of movement is determined by the user. This aspect of the present invention provides a method for determining when and where each event or action is to occur. The location-based method for storing path and event data achieves several goals. First, the path/event model addresses editing considerations. Just as a film director can retake sections of a movie, the user is able to edit details or events in the movie, changing the actions, costumes, orientation, etc. of each actor without requiring rerecording of the actor's path. For example, a user is able to reorient the actor midway through a scene, or to change a hop action to a slow walk action beginning in any frame without rerecording the entire path, and without disrupting synchronization wherever possible. The path also has enough precision to retain its WYSIWYG (what you see is what you get) characteristics. When the movie is replayed, this allows the actor to appear exactly as it did when the movie was recorded. The amount of data required to store the path/event list is not overly large. In the preferred embodiment, each frame requires 12 bytes of storage. In addition, the path storage attempts to reflect intentional mouse movement by applying a simple averaging algorithm to smooth out noise level irregularity.

To facilitate editing and the other considerations, this aspect of the present invention provides a location-based event model. The path and the event stream are stored separately. The path contains the 3D coordinates of the actor as it travels along a path. The path is parameterized such that it is possible to map the distance along the path to an (x, y, z) point in 3-space. Each event, such as an action, orientation or costume change event, includes both a path parameter, and a time parameter, which can identify the elapsed time at the given path location. Therefore, to represent an actor standing in place, the event stream would indicate the stationary action of standing, a path parameter identifying the location of the stationary action, and a time element indicating the amount of time spent performing that action at that location.

When a movie is played, if an actor is moving along the path, the events that are applied are those that correspond to the newly traversed section of the path. If an actor is stationary, the events that are applied are those that correspond to the indicated time period at the current path point.

Those skilled in the art will appreciate that once the actor's original path is recorded, editing affects only the event list and will not affect the stored path data unless the user rerecords a portion of the path. By binding events to path locations, many synchronization problems found in the prior art are resolved. Returning to the above example in which changing a walk to a run results in the actor sitting before reaching the chair, the sit action would consistently happen at the location of the chair regardless of whether the initial action was a run or a walk.

In the preferred program, the location-based event model is stored in RAM 17 (FIG. 1) as follows. The path is described by a set of path nodes, ((x, y, z),dist), where (x, y, z) is the location of the actor in 3-space and "dist" is a distance to the next path node. The concept of path nodes is discussed below. The dist parameter is an optimization that will be described below.

In the event list, each event includes the following path and time parameters:

1. an index into the path, identifying the ith node
2. the distance beyond the ith node identifying the path location for the event
3. the time elapsed at the above path location.

Note that the information in items 1 and 2 could easily have been combined as the simple distance along the path. However, separating 1 and 2 is a localization optimization that makes it possible, for example, to rerecord or truncate early sections of the path without it being necessary to recompute the path parameters for all subsequent events. Similarly, item 3 could have been the absolute elapsed time. Instead, it uses delta time as a localization optimization to avoid otherwise unnecessary recomputation from edits. As a result of this method of separately storing path and event data, events are executed at their proper location and time.

During the recording processing, mouse and path-based smoothing is applied before the location is determined where the actor is to be displayed in each frame. This allows path smoothing to reduce path irregularity, while simultaneously preserving the WYSIWYG character of the movie. This allows the visual replay of the movie to be exactly the same as the original recording. In addition, path storage is limited to reasonable size, and both forward and backward transversal of the path is fast and accurate.

The preferred system and method for providing location-based path and event data will now be described in conjunction with FIGS. 5, 13–19. As mentioned above, FIGS. 5a and 5b are illustrations of screen displays associated with the recorded actions of the actor 385. In FIG. 5a, the actor 385 is performing a running action as he moves across the screen from left to right. In FIG. 5b, the actor 385 is lying down after having completed a falling action, which took place after the actor 385 reached a point near the right side of the screen.

FIG. 13 illustrates series of frames or cells that make up a preanimated running sequence. Such a sequence of actions is repeated as an actor moves along a path in order to give the appearance that the actor is running across the screen. As mentioned above, the distance between each cell is determined by the particular action being rendered. Therefore, preanimation results in the actor going a predetermined distance before the next cell in the sequence needs to be displayed. As the user moves the mouse during the recording process, the user will not see the next frame displayed until the actor has traveled the distance to the next cell.

Figure 14:
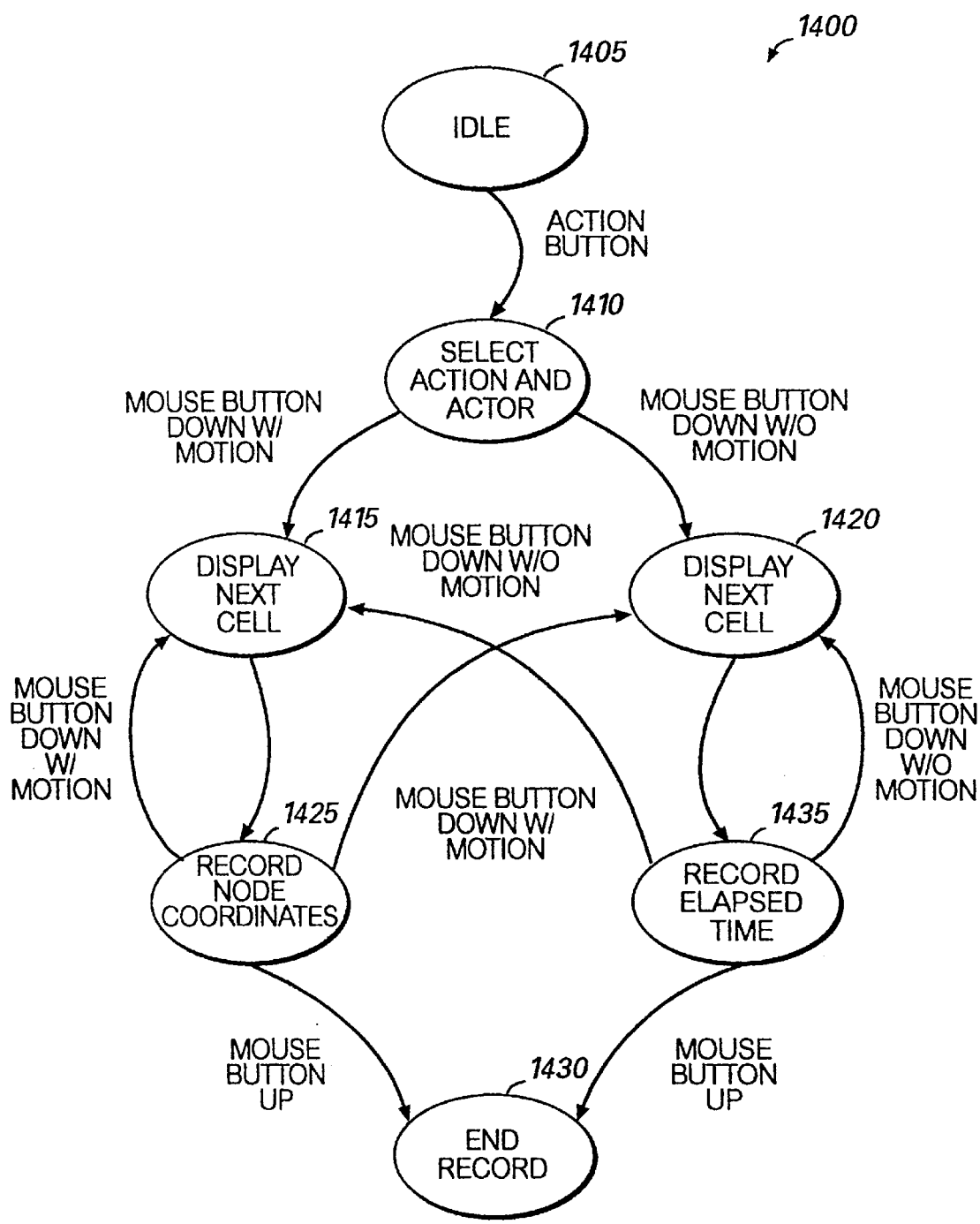
FIG. 14 is a state diagram illustrating the preferred method for recording a location-based path representation of the data corresponding to an actor's path and actions.
Figures 15, 16:
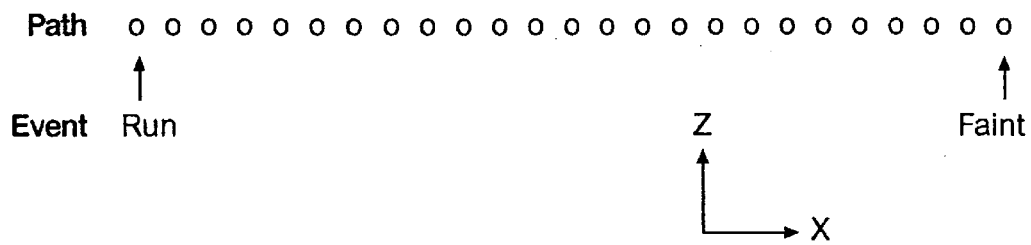
FIG. 15 is a diagram of an originally recorded path traversed by an actor and associated event data.
FIG. 16 is a table of values stored in a path list and an event list corresponding to the diagram of FIG. 15.

FIGS. 14–16 illustrate the steps that take place while a movie is being recorded and the data that results. The example of FIGS. 14–16 coincides with the animation depicted in FIG. 5, in which the actor runs across the screen from left to right, and then faints after reaching a point near the right side of the display. FIG. 14 is a state diagram illustrating an exemplary method 1400 for recording a location-based animated sequence. FIG. 15 is a diagram that illustrates a path traveled by the actor, the nodes created during the recording process, and the actions that are taking place along the path. FIG. 16 is a table that illustrates the path and events lists associated with the example of FIGS. 13 and 14.

In the state diagram of FIG. 14, the method 1400 begins at the idle state 1405. When the user selects the action button displayed on the display, the method advances to state 1410. At state 1410 the user selects the desired action (e.g., running) and identifies the actor to which the action will be applied. The recording begins when the user presses the mouse button. If the user is also moving the mouse, the method proceeds to state 1415. If the mouse is stationary while the button is depressed, the method proceeds to state 1420.

At state 1415 the method 1400 is recording the path as the actor is being moved by the user. This involves identifying and storing the coordinates of nodes, which are used to define the actor's path. At state 1415 the computer determines when the mouse has moved far enough to arrive at the next cell in the preanimated sequence. As mentioned earlier, preanimation results in going a predetermined distance before the next action needs to be displayed. As the user moves the mouse, he or she will not see the next frame in the sequence displayed until the actor has traveled the predetermined distance to the next frame. Once the actor has traveled a sufficient distance, the next frame is displayed at state 1415. From state 1415 the method proceeds to state 1425 and records the location of the node that is identified with the cell displayed in state 1415.

If the user releases the mouse button, the method advances to state 1430 and terminates. If the user continues to hold down the mouse button and move the mouse, the method 1400 returns to state 1415 and displays the next cell in the preanimated sequence. If at state 1425 the user continues to depress the mouse button but holds the mouse stationary, the method proceeds to state 1420.

At state 1420 the computer records time-based action taking place at a single point in the path. At state 1420 the method displays the next cell in the preanimated sequence after a predetermined amount of time has elapsed. From state 1420 the method goes to state 1435 where the elapsed time at that location is recorded in the event list.

If the user releases the mouse button, the method advances to state 1430 and terminates. If the user continues to hold down the mouse button and move the mouse, the method 1400 returns to state 1415 and displays the next cell in the preanimated sequence. If at state 1425 the user continues to depress the mouse button but holds the mouse stationary, the method proceeds to state 1420.

FIG. 15 illustrates an exemplary path associated with an actor running across the screen and fainting. FIG. 15 represents a bird's eye view of the path and indicates movement in the x-z plane. In this particular example, the actor moves in a straight line along the x-axis only. The circles along the path indicate the nodes, which represent the location each cell in the preanimated sequence was displayed. FIG. 15 also indicates where along the path the run and faint actions began.

FIG. 16 is a table that illustrates the path and events lists associated with the example of FIGS. 14 and 15. As mentioned above, the path list and event list are stored separately. Once the original path is recorded, editing the movie does not change the path list unless the path itself is rerecorded.

As illustrated in FIG. 16, the path list includes the (x, y, z) coordinates for each node in the path and the distance from each node to the next node in the path. The headings used in the path list of FIG. 16 are as follows:

| | |
|---|---|
| Node # | sequential node numbers |
| Coord | (x, y, z) coordinates of the node |
| d | distance from current node to next node |

As also illustrated in FIG. 15, the event list indicates the action to be performed by the actor and the place at which the action takes place. The headings used in the event list are as follows:

| | |
|---|---|
| Action | action to be performed by the actor |
| Node | node at or beyond which action begins or takes place |
| +D | distance beyond Node at which action takes place |
| ET | elapsed time at current position performing action |
| VAR | variable, if needed (e.g., which costume to change to) |

Thus, the event list of FIG. 16 indicates that the actor begins to run at node 0 and continues to do so until he reaches node 50. At node 50, the actor is stationary and faints performs the fainting action over the next 15 seconds.

Figure 17:
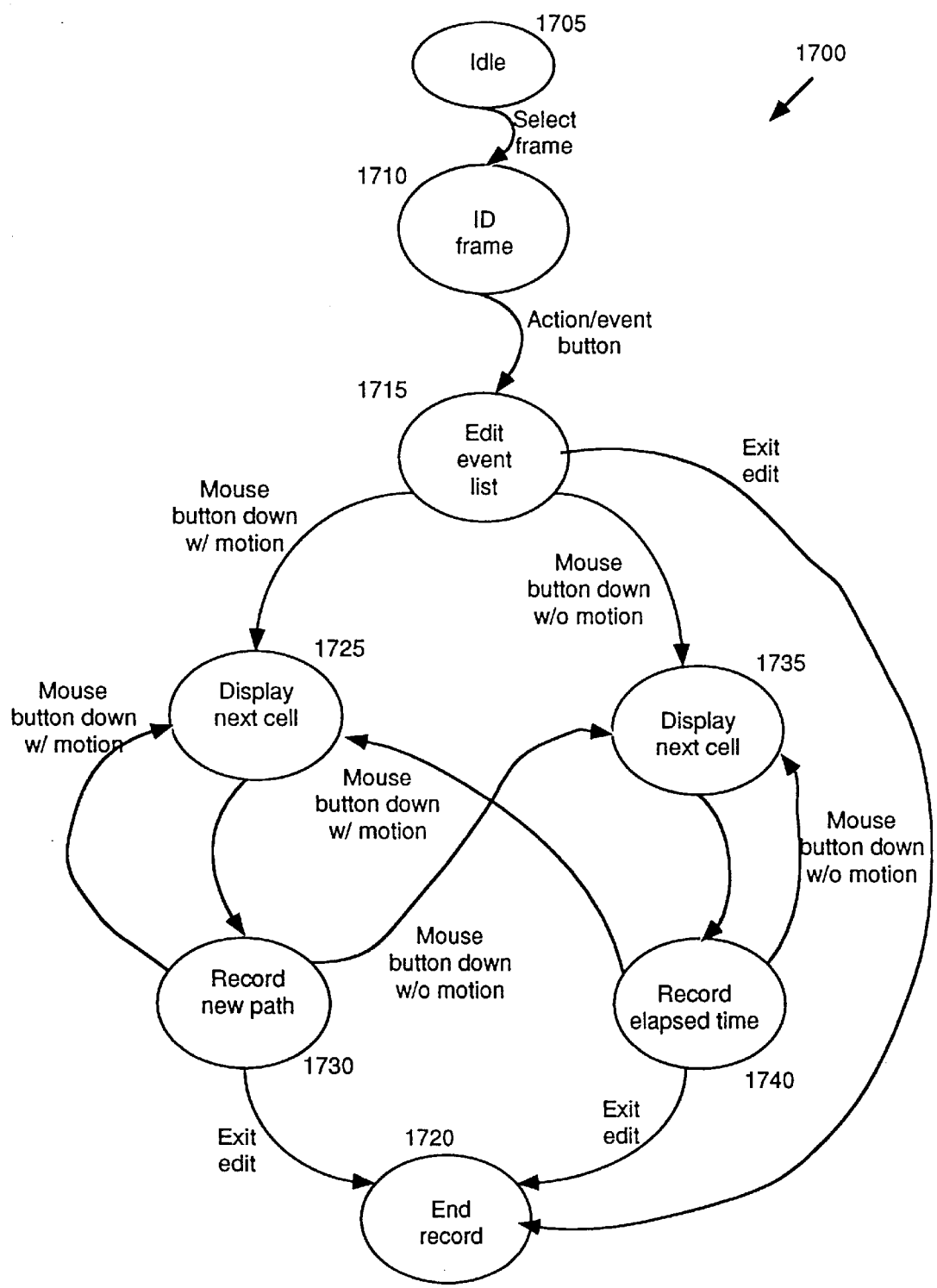
FIG. 17 is a state diagram illustrating the preferred method for editing a location-based path representation of the data corresponding to an actor's path and actions.

FIGS. 17–19 illustrate the process of editing a movie and the data that results from the editing process. The example of FIGS. 17–19 coincides with editing the movie of FIG. 15 so that the actor begins walking at a point approximately ¼ of the way across the screen, changes costumes at the half way point, continues walking to the right side of the screen, and then faints. FIG. 17 is a state diagram illustrating an exemplary method 1700 for editing a location-based animated sequence. FIG. 18 is a diagram that illustrates a path traveled by the actor, the nodes created during the recording process, and the actions that are added during the editing process. FIG. 19 is a table that illustrates the path and event lists associated with the edited example.

In the state diagram of FIG. 17, the method 1700 begins at the idle state 1705. When the user advances the movie to the frame he or she wants to edit, the method advances to state 1710 where it identifies the frame that is being displayed. When the user selects an action or event button and identifies an actor, the method goes to state 1715. At state 1715 the computer edits the event list to indicate that the newly selected action or event begins at that frame. From state 1715 the method advances depending on the input provided by the user.

If the user exits the editing process at that point without doing any additional editing, the method advances to state 1720 and terminates the editing process. The edited movie is now available to be viewed.

If, at state 1715 the user presses the mouse button, the action depends on whether the mouse is moving or stationary. If the mouse is moving, the method goes to state 1725 and begins to record a new path. In the preferred program, this results in the remainder of the original path being truncated. If the user desires to merely add a new path segment and then return to the closest point on the original path, this may be accomplished by holding down the SHIFT+CNTRL keys while moving the mouse. When editing the path, the computer determines when the mouse has moved far enough to arrive at the next cell in the preanimated sequence associated with the selected action. As mentioned earlier, preanimation results in going a predetermined distance before the next action needs to be displayed. As the user moves the mouse, he or she will not see the next frame in the sequence displayed until the actor has traveled the predetermined distance to the next frame. Once the actor has traveled a sufficient distance, the next frame is displayed at state 1725. From state 1725 the method proceeds to state 1730 and records the location of the node that is identified with the cell displayed in state 1725.

If the user releases the mouse button, the method advances to state 1720 and terminates. If the user continues to hold down the mouse button and move the mouse, the method 1700 returns to state 1725 and displays the next cell in the preanimated sequence. If, at state 1735, the user continues to depress the mouse button but holds the mouse stationary, the method proceeds to state 1735.

If, at state 1715 the user presses the mouse button while holding the mouse stationary, the method goes to state 1735. At state 1735 the computer records time-based action taking place at a single point in the path. At state 1735 the method displays the next cell in the preanimated sequence after a predetermined amount of time has elapsed. From state 1735 the method goes to state 1740 where the elapsed time at that location is recorded in the event list.

If the user releases the mouse button, the method advances to state 1720 and terminates. If the user continues to hold down the mouse button and moves the mouse, the method 1700 goes to state 1725 and displays the next cell in the preanimated sequence. If at state 1740 the user continues to depress the mouse button while holding the mouse stationary, the method returns to state 1735.

FIG. 18 illustrates the edited path associated with actor running across a portion of the screen, walking for a while, changing costumes, and fainting. Like FIG. 15, FIG. 18 represents a bird's eye view of the path and indicates movement in the x-z plane. The circles along the path indicates the nodes, which represent the location each cell in the preanimated sequence was displayed when the path was originally recorded. FIG. 18 also indicates where along the path the run and faint actions began.

FIG. 19 is a table that illustrates the path and events lists associated with the edited example of FIGS. 17 and 18. As mentioned above, once the original path is recorded, editing the movie does not change the path list unless the path itself is rerecorded.

As illustrated in FIG. 19, the path list includes the (x, y, z) coordinates for each node in the path and the distance from each node to the next node in the path. Because the path has not been changed, these values are the same as the values included in the path list of FIG. 16.

As mentioned earlier, the nodes are placed when initial action is recorded and define the shape of the path. As a result, unless the path itself is changed, the same nodes are maintained even if actions along the path are edited. Those skilled in the art will appreciate that the cells associated with the preanimated actions added during edits may not fall on the originally recorded nodes. However, the preferred application program will display the cells at the proper location along the path as the actor moves along the path.

FIG. 19 also illustrates the edited event list, which now includes the switch to walking at node 10 and a costume change at node 25. The event entry associated with the costume change include a value for the variable. In this case, the variable is needed to indicate which costume the actor is supposed to change to. Once the actor changes costumes at node 25, it continues walking to node 50 where the actor faints in place as before.

From the foregoing examples, those skilled in the art will appreciate that the present invention facilitates and simplifies the editing process by ensuring that events subsequent to the edits still occur where the user expects them to. For example, in the present case, the actor still faints at the right edge of the display. This happens in the correct position regardless of whether the actor runs there quickly or walks there fairly slowly.

In summary, the location-based path model of the present invention allows a recorded movie to be edited while maintaining the synchronization with other events and the positions at which those events originally occurred. In this manner, the present invention provides the ease of both first time recording and subsequent editing and provides a powerful and intuitive interface for the user.

Costume Changer

One possible event that can be recorded by the preferred program is for the actor to change costumes. FIG. 6 illustrates the user interface for changing costumes, as previously discussed. The preferred program displays the costume changer dialog 600 when the user desires to change the costume of an actor 385.

As previously mentioned, a 3D actor is a representative type of object that can be rendered on the monitor. Objects can contain a number of object parts that are related to each other and that can be grouped into sets. For example, if the object is a 3D humanoid actor, the object parts can correspond to various body parts.

Another aspect of the present invention involves changing the appearance of the object. Rather than forcing the user to individually change the appearance for each individual object part, intuitive sets of object parts are created. These object part sets allow a user to change the appearance, also described as a costume or attribute, for a selected set of object parts with a single user-interface operation.

Figure 20:
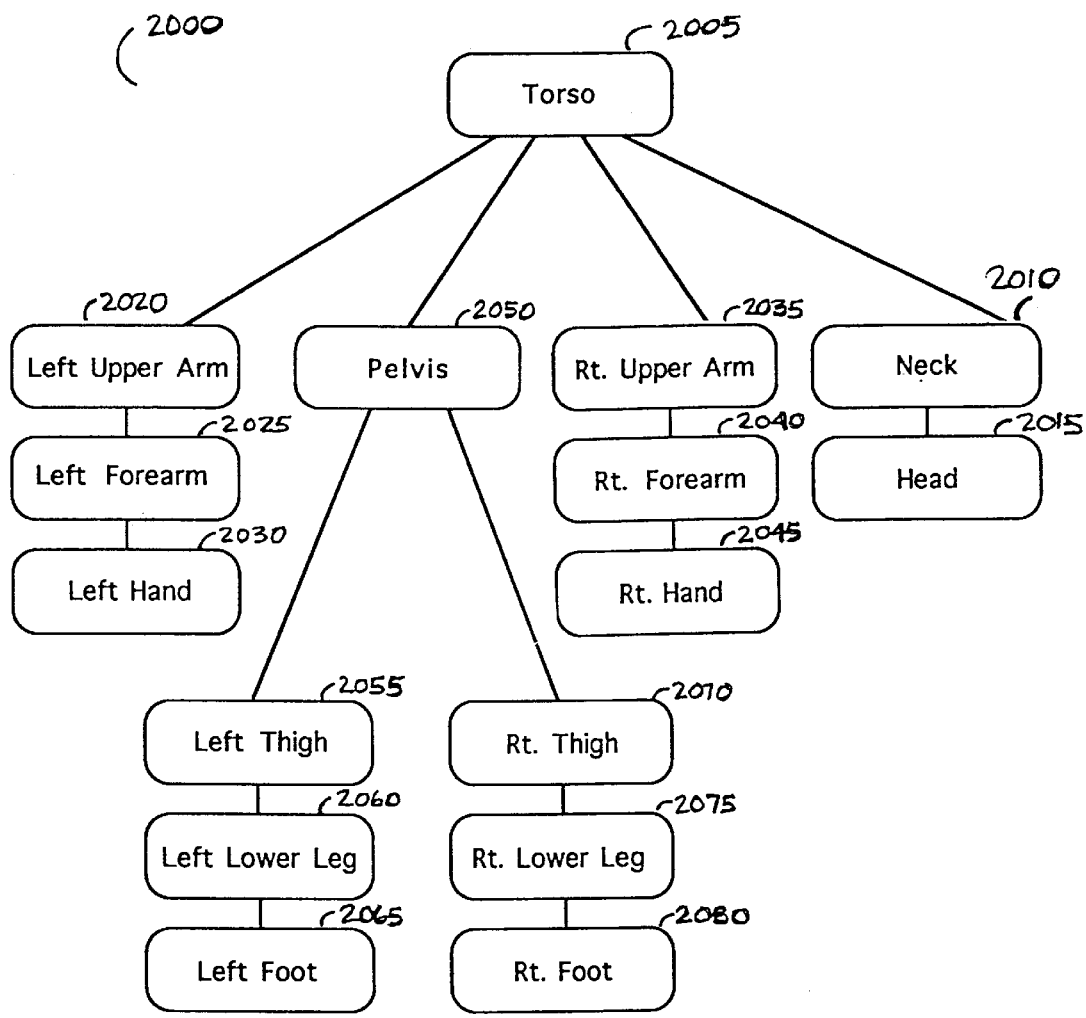
FIG. 20 is a diagram that graphically illustrates the hierarchical relationship between object parts that make up an object.

FIG. 20 is a diagram that illustrates an exemplary hierarchical relationship for a group of object parts that make up an object, such as an actor. For purposes of the discussion with respect to FIGS. 20–24, the object is represented by an actor. However, those skilled in the art will appreciate that this aspect of the present invention is useful for other types of objects.

The object parts are associated with certain attributes that define the appearance of the overall object. The attributes for the overall object are made up of distinct display parameters. Each object part has display parameters, such as an associated shape, material, and an optional texture-map attribute. The shape attribute describes the volume of the object part. The material attribute defines the base color of the object part and how it interacts with light (e.g., how "shiny" it is). The texture-map attribute defines the detailed appearance of the object part. Texture-map attributes are used in the preferred embodiment to provide details like facial expression and clothing details and to help make the object, such as a 3D humanoid actor, look realistic.

Referring now to FIG. 20, an object 2000 is illustrated as an exemplary collection of object parts 2005–2080 that are graphically linked together in a predefined hierarchical manner. The object 2000 shown in FIG. 20 is exemplary of a 3D humanoid actor. In the preferred embodiment, a torso object part 2005 is the base or highest order object part in this example object 2000. The hierarchical relationship to the other object parts 2010–2080 is described as follows.

The torso object part 2005 is linked to a neck object part 2010, which is further linked to a head object part 2015. The torso object part 2005 is also linked to a left upper arm object part 2020, which is further linked to a left forearm object part 2025, which is further linked to a left hand object part 2030. The torso object part 2005 is also linked to a right upper arm object part 2035, which is further linked to a right forearm object part 2040 which, in turn, is further linked to a right hand object part 2045.

Additionally, the torso object part 2005 is linked to a pelvis object part 2050. The pelvis object part 2050 is linked to a left thigh object part 2055, which is further linked to a left lower leg object part 2060, which is further linked to a left foot object part 2065. The pelvis object part 2050 is also linked to the right thigh object part 2070, which is further linked to the right lower leg object part 2075, which is further linked to the right foot object part 2080.

From a visual perspective, renderings of object parts can be displayed on the computer monitor as being flexibly related. Referring to FIG. 20, this means that connections between object parts act as "joints" allowing flexibility between the generally rigid object parts. For example, while the left hand object part 2030 is linked to left forearm object part 2025, each can be successively presented on the computer monitor with different orientations. The connection between the left hand object part 2030 and the left forearm object part 2025 acts as a joint. Thus, the object 2000 can be animated by rendering the object parts 2005–2080 in successively different positions about the joints while remaining flexibly linked together.

As discussed in more detail below, the hierarchical relationship between each object part 2005–2080 is established in order to intuitively create sets of these object parts 2005–2080. The hierarchical relationship and the sets of object parts are described in more detail in FIGS. 21–23.

FIG. 21 is a table 2100 that numerically illustrates the hierarchical relationship between the object parts illustrated in FIG. 20. The table 2100 includes a list of each of the object parts illustrated in FIG. 20 and the corresponding object part number. In addition, a hierarchical "parent" relationship is designated using the object part number for the higher-order object part linked to that particular object part. In this manner, when any motion is applied to a parent object part, motion is also inherently applied to the lower-order "child" object parts. Furthermore, with this numeric approach, it is a straightforward matter to maintain a list of which object parts are linked to other object parts.

The last column of the table 2100 lists an object part set number for each object part. As mentioned earlier, rather than forcing the user to individually change the appearance for each object part, intuitive sets of object parts are created. The display attribute for each object part set includes a display parameter for each object part in the set. Utilizing object part sets allows a user to change the display attribute for a selected set of object parts in a single user-interface operation.

FIG. 22 is a table 2200 designating specific object part sets listed in FIG. 21. Each object part set is selected in a manner that is consistent with a user's expectations for the specific type of object and is designated with a different number. For example, the "shirt" object part set from the table 2200 was created for the actor object 2000 illustrated in FIG. 20. The "shirt" object part set is given the designation "0" and intuitively includes five distinct object parts: the torso, left upper arm, left forearm, right upper arm, right forearm listed in the table 2100 in FIG. 21. Thus, a group of display parameters for the object parts in the "shirt" set makes up the display attribute or costume for the "shirt."

FIG. 23 is a table 2300 of display parameters forming different display attributes or costumes for a "shirt" object part set. Each object part of the "shirt" is listed in the columns of the table 2300. The object parts in the table 2300 are listed from the left, in descending hierarchical order, as determined from the object part number in table 2100. Underneath each object part is listed the display parameter for that object part. Thus, each row contains a group of display parameters making up a single costume of the "shirt" object part set. Group 1 is a "shirt" that is totally white. Group 2 is a "shirt" that is denim. Group 3 is a "shirt" that appears as a green short sleeve shirt by making the left forearm and right forearm flesh colored.

As a result, the user is able to change the object's "shirt" by cycling through different groups of display parameters for the "shirt" object part set. The user accomplishes this by placing the cursor on any one of the object parts that make up the "shirt" and repeatedly clicking the mouse button.

Figure 24:
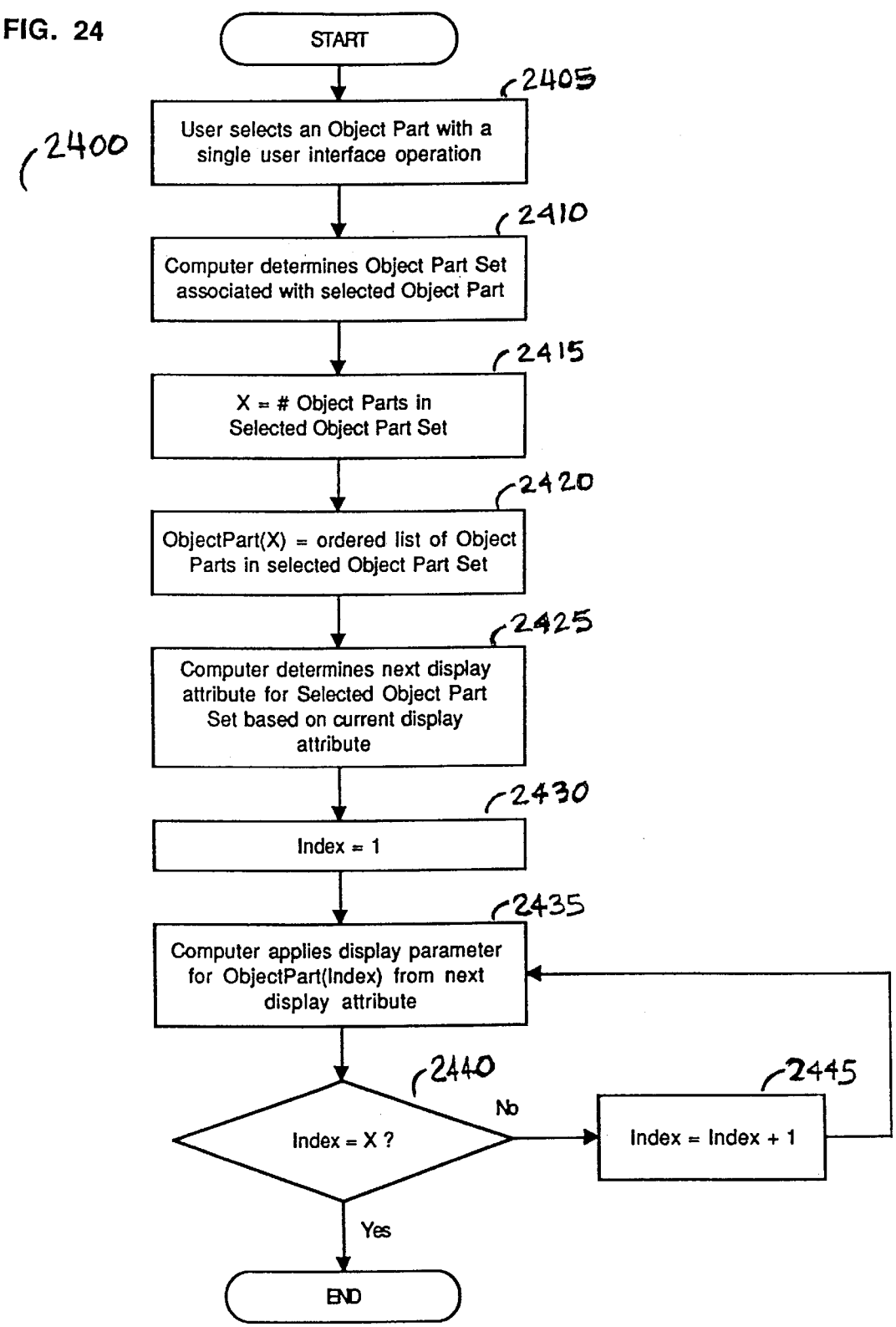
FIG. 24 is a flow diagram illustrating the preferred method of using a single user interface operation to change the appearance of an object having multiple object parts.

FIG. 24 is a flowchart illustrating an exemplary method 2400 of using a single user interface operation to change the appearance of an object having multiple object parts. The method 2400 begins at step 2405 by displaying object on the monitor. The user can select one of the object parts of the object with a single user interface operation, such as clicking a mouse button when the cursor is positioned over the desired object part.

In step 2410, the computer responds to the single user interface operation by determining which object part set is associated with the selected object part. As mentioned earlier, an object part number is associated with each object part. The selected object part set is determined by looking in a table of object parts, similar to the table 2100 from FIG. 21, using the selected object part number as a pointer. In step 2415, a variable, X, is defined as the total number of object parts within the selected object part set. In step 2420, an array, ObjectPart(X), is defined to contain a list of the object parts in descending hierarchical order for the selected object part set.

As mentioned earlier, a costume includes a group of display parameters for each object part in an object part set. The preferred program has a predetermined number of different costumes for each object part set. For example, three different groups of display parameters or costumes for a "shirt" object part set are listed in the table 2300 in FIG. 23.

In step 2425, the computer determines the next display attribute or costume for the selected object part set based upon the current costume. The computer tracks the current costume on a particular row of a data table populated with display parameters for each object part, similar to the table 2300 in FIG. 23. Using the "shirt" example from FIG. 23, the current costume for the "shirt" may be Group 2. Accordingly, the computer would determine the next display attribute or costume for the "shirt" by reading the display parameters from the next row corresponding to Group 3. However, if the current costume for the "shirt" is Group 3 (last row), the next display attribute or costume is determined by reading the display parameters from Group 1 (first row). Thus, there is continuously a "next" costume for the selected object part set.

Turning back to FIG. 24, the costume for the object part set is presented to the user in steps 2430–2445. To accomplish this, the computer displays the set of object parts in hierarchical order using the appropriate display parameter for each object part. For the "shirt" example of FIG. 23, the costume defined in Group 3 would be presented by individually applying green to the torso, green to the left upper arm, flesh color to the left forearm, green to the right upper arm, and flesh color to the right forearm.

Referring back to FIG. 24, in step 2430, an index variable, Index, is set to one. In step 2435 the appropriate display parameter is applied to an individual object part in the set. In step 2440, the method 2400 ends if new display parameters have been applied to all object parts in the set. Otherwise, step 2445 increments the index variable and the appropriate display parameter is applied to the next object part in the set in step 2435. Thus, via a single user interface operation, the user is able to change the appearance of an object having multiple object parts.

SUMMARY OF THE DETAILED DESCRIPTION

From the foregoing description, it will be appreciated that the present invention provides a system and method for placing and orienting objects in space and for recording actions performed by the objects as they travel along a path. This system and method are embodied in a process of creating a 3D computer animated movie. In summary, a 3D scene and actor (a class of 3D rendered objects) are initially selected by the user. The user moves the mouse to place and orient the actor within the 3D scene. Positioning and orienting of the actor is accomplished based on the distance and angle of mouse movement. One aspect of the present invention provides an efficient and natural interface for users to manipulate 3D objects without requiring additional types of input beyond 2D mouse inputs. Once the actor has been placed in the desired initial location and with the desired orientation, the content of the movie can be recorded. Another aspect of the present invention records the path along which an actor is moved and the actions performed by the actor at specific locations along the path. By using a location-based recording model, editing and synchronization of the movie are enhanced. An example of one such action is for the actor to change costumes. The costume of the actor is changed by selecting part of the actor with a single user interface operation, such as a mouse click. Repeatedly clicking upon the selected part of the actor cycles through different costumes on that part of the actor.

The foregoing system may conveniently be implemented in a program module or program that is based upon the flow charts in FIGS. 7, 8, 14, 17, and 24. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. Although the present invention has been described in the context of a humanoid actor in a movie scene, those skilled in the art will understand that the principles of the present invention apply to any tasks or processes that render a 3D object in 3D space. Additionally, although the present invention has also been described in the context of actions performed by an actor traveling along a path, those skilled in the art will understand that the principles of the present invention apply to any tasks or processes that require associating events with related movement of a 3D object in space. Changing the costume of an actor is merely an example of an event related to a 3D object. Moreover, aspects of the present invention may also be applied to any of a number of scenarios, including changing the texture or shape of legs on a rendered representation of a piece of furniture and changing the type of tire on a rendered representation of an automobile.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-readable medium storing computer executable-instructions for performing the steps of:
    defining a three-dimensional space with reference to a three dimensional coordinate system;
    defining an object located at an initial position and orientation in the three dimensional space;
    receiving user input corresponding to movement of a two-dimensional input device;
    translating the two-dimensional user input into movement of the object in the direction of the object orientation in the three-dimensional space;
    if the distance of the object movement during a time interval is greater than a predefined threshold, interpreting the user input as a change in the position of the object in the three-dimensional space; and
    if the distance of the object movement during the time interval is not greater than the predefined threshold, interpreting the user input as a change in the orientation of the object in the three-dimensional space.

2. The computer-readable medium of claim 1, wherein said computer-executable instructions further perform the steps of:
    calculating the distance D between the initial location and a candidate location;
    calculating a candidate orientation for the object;
    determining a display location for the object based on the distance D, the initial orientation, and the candidate orientation;
    determining a display orientation for the object based on the distance D, the initial orientation, and the candidate orientation; and
    displaying the object at the display location and oriented at the display orientation in the three dimensional space.

3. The computer-readable medium of claim 2, wherein the step of determining the display orientation includes smoothing the movement of the object to avoid the appearance of discrete rotational turns by the object.

4. The computer-readable medium of claim 2, wherein the candidate orientation is calculated by computing the angular change between the initial orientation and an orientation specified by a vector having an origin at the initial location and pointing toward the candidate point.

5. The computer-readable medium of claim 2, wherein said computer-executable instructions further perform the steps of:

determining whether the distance D is above a predetermined threshold value;

determining whether the angular change between the initial and candidate orientations is above a threshold degree; and if the distance D is above a threshold distance value and the angular change between the initial and candidate orientations is above a threshold degree, then momentarily damping the distance D in determining the display location and setting the display orientation equal to the candidate orientation while the object is being displayed wherein the object has the appearance of a momentary pause prior to turning to the display orientation and moving in the direction of the display orientation.

6. The computer-readable medium of claim 2, wherein said computer-executable instructions further perform the steps of:

determining whether the distance D is above a predetermined threshold value;

determining whether the angular change between the initial and candidate orientations is above a threshold degree; and if the distance D is above a threshold distance value and the angular change between the initial and candidate orientations is not above a threshold degree, then setting the display location at the distance D and setting the display orientation equal to the candidate orientation while the object is being displayed such that the object precisely tracks the user's input.

7. The computer-readable medium of claim 2, wherein said computer-executable instructions further perform the steps of:

determining whether the distance D is above a predetermined threshold value;

determining whether the angular change between the initial and candidate orientations is above a threshold degree; and if the distance D is not above a threshold distance value and the angular change between the initial and candidate orientations is above a threshold degree, then damping the distance D in determining the display location and smoothing the candidate orientation in determining the display orientation wherein the object is rotated without the appearance of discrete rotational turns.

8. The computer-readable medium of claim 2, wherein said computer-executable instructions further perform the steps of:

determining whether the distance D is above a predetermined threshold value;

determining whether the angular change between the initial and candidate orientations is above a threshold degree; and if the distance D is not above a threshold distance value and the angular change between the initial and candidate orientations is not above a threshold degree, then smoothing the candidate orientation in determining the display orientation while keeping the object at the initial location.

9. The computer-readable medium of claim 1, wherein said computer-executable instructions further perform the steps of:

determining a first action to be performed by the object;

providing a series of images associated with the first action, each of the images defining a distance of travel of the object;

determining whether the object is moving in response to user input;

in response to a determination that the object is moving, identifying a plurality of nodes along the path of movement, the nodes corresponding to the location associated with an occurrence of one of the series of images;

in response to a determination that the object is not moving, determining the location of the object and the amount of time the action is executed at the location;

storing a path list comprising the location of the nodes; and storing an event list comprising the location at which the first action begins.

10. The computer-readable medium of claim 9, wherein said computer-executable instructions further perform the step of storing the elapsed time first action is performed at the location.

11. The computer-readable medium of claim 9, wherein the location is indicated by the closest node to the location and the distance past the closest node to the location.

12. The computer-readable medium of claim 1, wherein said computer-executable instructions further perform the steps of:

selecting one of a plurality of object parts with a single operation, the selected object part associated with an object set, the object set having one of a plurality of attributes;

changing the one of the plurality of attributes associated with the object part set to a second of the plurality of attributes in response to selecting the object part; and displaying the object part set using the second of the plurality of attributes.

13. The computer-readable medium of claim 12, wherein each of the plurality of attributes defines a light-interaction characteristic and a color characteristic of the object part set.

14. The computer-readable medium of claim 12, wherein each of the plurality of attributes defines a visual appearance of the object part set.

15. The computer-readable medium of claim 12, wherein each of the plurality of attributes defines a shape characteristic of the object part set.

16. The computer-readable medium of claim 12, wherein each of the plurality of attributes includes a plurality of display parameters being assigned to each of the plurality of object parts associated with the object part set.

17. The computer-readable medium of claim 12, wherein the plurality of display parameters is capable of being heterogeneous.

18. A method of animating an object in three-dimensional space, comprising the steps of:

defining a three-dimensional space with reference to a three dimensional coordinate system;

defining an object located at an initial position and orientation in the three dimensional space;

receiving user input corresponding to movement of a two-dimensional input device;

translating the two-dimensional user input into movement of the object in the direction of the object orientation in the three-dimensional space;

if the distance of the object movement during a time interval is greater than a predefined threshold, interpreting the user input as a change in the position of the object in the three-dimensional space; and if the distance of the object movement during the time interval is not greater than the predefined threshold, interpreting the user input as a change in the orientation of the object in the three-dimensional space.

19. A computer system for animating an object in three-dimensional space, comprising:

a processing unit;

an input device connected to the processing unit; and a display device coupled to the processing unit for displaying the object;

the processing unit, responsive to instructions from a program module running on the computer system, being operative to:
(a) define a three-dimensional space with reference to a three dimensional coordinate system;
(b) define an object located at an initial position and orientation in the three dimensional space;
(c) receive user input corresponding to movement of a two-dimensional input device;
(d) translate the two-dimensional user input into movement of the object in the direction of the object orientation in the three-dimensional space;
(e) if the distance of the object movement during a time interval is greater than a predefined threshold, interpret the user input as a change in the position of the object in the three-dimensional space; and
(f) if the distance of the object movement during the time interval is not greater than the predefined threshold, interpret the user input as a change in the orientation of the object in the three-dimensional space.

20. A method of creating an animated movie, comprising the steps of:

defining a three-dimensional space with reference to a three dimensional coordinate system;

defining an object located at an initial position and orientation in the three dimensional space;

selecting one of a plurality of available three-dimensional scenes;

selecting one of a plurality of available actors;

displaying the selected actor at an initial position in the selected scene;

receiving user input corresponding to movement of a two-dimensional input device;

translating the two-dimensional user input into movement of the object in the direction of the object orientation in the three-dimensional space;

if the distance of the object movement during a time interval is greater than a predefined threshold, interpreting the user input as a change in the position of the object in the three-dimensional space; and if the distance of the object movement during the time interval is not greater than the predefined threshold, interpreting the user input as a change in the orientation of the object in the three-dimensional space.

21. A computer system for creating an animated movie, comprising:

a processing unit;

an input device connected to the processing unit; and a display device coupled to the processing unit for displaying the object;

the processing unit, responsive to instructions from a program module running on the computer system, being operative to:
(a) define a three-dimensional space with reference to a three dimensional coordinate system;
(b) define an object located at an initial position and orientation in the three dimensional space;
(c) select one of a plurality of available three-dimensional scenes;
(d) select one of a plurality of available actors;
(d) display the selected actor at an initial position in the selected scene;
(e) receive user input corresponding to movement of a two-dimensional input device;
(f) translate the two-dimensional user input into movement of the object in the direction of the object orientation in the three-dimensional space;
(g) if the distance of the object movement during a time interval is greater than a predefined threshold, interpret the user input as a change in the position of the object in the three-dimensional space; and
(h) if the distance of the object movement during the time interval is not greater than the predefined threshold, interpret the user input as a change in the orientation of the object in the three-dimensional space.

22. A computer-readable medium storing computer-executable instructions for performing the steps of:

defining a three-dimensional space with reference to a three dimensional coordinate system;

defining an object located at an initial position and orientation in the three dimensional space;

selecting one of a plurality of available three-dimensional scenes;

selecting one of a plurality of available actors;

displaying the selected actor at an initial position in the selected scene;

receiving user input corresponding to movement of a two-dimensional input device;

translating the two-dimensional user input into movement of the object in the direction of the object orientation in the three-dimensional space;

if the distance of the object movement during a time interval is greater than a predefined threshold, interpreting the user input as a change in the position of the object in the three-dimensional space; and if the distance of the object movement during the time interval is not greater than the predefined threshold, interpreting the user input as a change in the orientation of the object in the three-dimensional space.

* * * * *